(12) United States Patent
Otsuka et al.

(10) Patent No.: US 7,676,693 B2
(45) Date of Patent: Mar. 9, 2010

(54) METHOD AND APPARATUS FOR MONITORING POWER FAILURE

(75) Inventors: Hiroshi Otsuka, Kawasaki (JP); Koji Kurihara, Kawasaki (JP); Kazunori Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 11/783,053

(22) Filed: Apr. 5, 2007

(65) Prior Publication Data

US 2008/0082850 A1 Apr. 3, 2008

(30) Foreign Application Priority Data

Sep. 14, 2006 (JP) ............................. 2006-250069

(51) Int. Cl.
*G06F 11/00* (2006.01)

(52) U.S. Cl. ......................................... 714/23; 714/22
(58) Field of Classification Search ................ 714/23
See application file for complete search history.

(56) References Cited

U.S. PATENT DOCUMENTS

| | | | | |
|---|---|---|---|---|
| 4,234,920 A * | 11/1980 | Van Ness et al. | ............... | 714/22 |
| 4,330,826 A * | 5/1982 | Whiteside et al. | ............. | 714/12 |
| 4,553,204 A * | 11/1985 | Hashimoto | .................... | 714/24 |
| 5,627,962 A * | 5/1997 | Goodrum et al. | ............. | 714/13 |
| 5,928,368 A * | 7/1999 | Jardine et al. | .................. | 714/22 |
| 6,496,881 B1 * | 12/2002 | Green et al. | .................. | 710/58 |
| 6,658,597 B1 * | 12/2003 | Ker et al. | ...................... | 714/23 |
| 7,142,404 B1 * | 11/2006 | Bikulcius et al. | ............. | 361/92 |
| 2002/0152425 A1 * | 10/2002 | Chaiken et al. | ............... | 714/23 |
| 2009/0132061 A1 * | 5/2009 | Stubbs et al. | .................. | 700/8 |

FOREIGN PATENT DOCUMENTS

JP         02-105654         4/1990

* cited by examiner

*Primary Examiner*—Gabriel L Chu
(74) *Attorney, Agent, or Firm*—Staas & Halsey LLP

(57) ABSTRACT

A status notification register storing a state of a function executing section is arranged for each function executing section. The function executing section includes at least one circuit for performing a predetermined function. By determining one of two values set in the status notification register, a power failure occurring in a functional unit is identified and an initial setting process is performed to an identified location when power is restored.

12 Claims, 16 Drawing Sheets

| NO | COMBINATION OF STATES OF THREE FUNCTIONAL UNITS | | | INITIAL SETTING ORDER | | |
|---|---|---|---|---|---|---|
| | UNIT-1 | UNIT-2 | UNIT-3 | FIRST | SECOND | THIRD |
| 1 | OPERATIVE STATE | OPERATIVE STATE | OPERATIVE STATE | — | | |
| 2 | OPERATIVE STATE | OPERATIVE STATE | RESET STATE | UNIT-3 | | |
| 3 | OPERATIVE STATE | RESET STATE | OPERATIVE STATE | UNIT-2 | | |
| 4 | OPERATIVE STATE | RESET STATE | RESET STATE | UNIT-2 | UNIT-3 | |
| 5 | RESET STATE | OPERATIVE STATE | OPERATIVE STATE | UNIT-1 | | |
| 6 | RESET STATE | OPERATIVE STATE | RESET STATE | UNIT-1 | UNIT-3 | |
| 7 | RESET STATE | RESET STATE | OPERATIVE STATE | UNIT-1 | UNIT-2 | |
| 8 | RESET STATE | RESET STATE | RESET STATE | UNIT-1 | UNIT-2 | UNIT-3 |

METHOD AND APPARATUS FOR MONITORING POWER FAILURE

BACKGROUND OF THE INVENTION

1. Field of the Invention

The present invention relates to a method and apparatus for monitoring a power failure in an apparatus containing at least one functional unit which executes a predetermined function, by monitoring the power failure in at least one function executing section contained in each functional unit, and for restoring the functional unit.

2. Description of the Related Art

FIG. 1 illustrates a relationship between an apparatus and a functional unit. For example, to provide a variety of communication service functions, transmission equipment operating as a node in a communication network includes at least one of functional unit 910-1 through 910-n to provide a variety of functions and a monitoring control unit 920 for monitoring and controlling the at least one of functional unit 910-1 through 910-n. The monitoring control unit 920 and functional units 910 are interchangeable in structure with each other to provide flexibly various functions.

FIG. 2 illustrates an example of a functional unit in a known apparatus. The functional unit 910 in the apparatus includes a primary power monitor 911, an on-board power supply 912 (for generating secondary power from primary power), a secondary power monitor 913 (for monitoring a secondary power voltage and generating a reset control signal), and a function executing circuit 914 (for example, an integrated circuit) for executing a function of the functional unit.

The monitoring control unit 920 in the apparatus includes a primary power monitor 921, an on-board power supply 922 (for generating secondary power 32 from primary power 30), a secondary power monitor 923 (for monitoring a secondary power voltage and generating a reset control signal 42), and a monitoring control processor 924 (for executing a monitoring control function to the functional unit 910). The monitoring control unit 920 and the functional unit 910 are supplied with the primary power 30 (DC-48V, for example) directly from a power facility.

When the primary power 30 is supplied from the power facility, the functional unit 910 monitors the voltage of the primary power 30. When the voltage of the primary power 30 reaches a voltage defined by each functional unit 910, the on-board power supply 912 generates the secondary power 31, and supplies the secondary power 31 to the function executing circuit 914 and the secondary power monitor 913. The secondary power monitor 913 monitors the voltage of the secondary power 31. If the secondary power 31 is not normal, the secondary power monitor 913 activates the reset control signal 41 (ON-state) and outputs the reset control signal 41 to the function executing circuit 914 until the voltage of the secondary power 31 becomes normal. Upon receiving the activated reset control signal 41, the function executing circuit 914 sets the internal circuit thereof to an initial state. When the power is restored, the secondary power monitor 913 deactivates the reset control signal 41 (into a reset release signal), and outputs the reset release signal to the function executing circuit 914.

After the reset control signal 41 is deactivated (reset released), the function executing circuit 914 in the functional unit 910 performs an initial setting process in response to a control signal 43 from the monitoring control unit 920, thereby becoming operative.

If the apparatus includes a plurality of functional units, the apparatus becomes operative after the initial setting process has been performed on all functional units required for the operation of the apparatus.

The monitoring control unit 920 monitors the voltage of the primary power 30 to restore a normal operating condition after an occurrence of power failures including a power interruption, an instantaneous voltage drop, a voltage drop, etc. in the primary power 30 supplied to each of the functional unit 910 and the monitoring control unit 920 from the power facility. At the timing the voltage of the primary power 30 is restored to a predetermined voltage or higher, the monitoring control unit 920 performs the initial setting process on the functional unit 910 by sending the control signal 43 and renders the functional unit 910 operative. The monitoring control unit 920 thus restores the functional unit 910 to the operative state from a shutdown state due to a temporary failure in the primary power 30.

Japanese Unexamined Patent Application Publication No. 02-105654 discloses a technique relating to an initial setting at a startup of a communication apparatus.

The known apparatus including at least one functional unit has drawbacks described below. If a temporary power shutdown or voltage drop takes place in the power facility, a power interruption in the primary power side or the second power side can escape detection because of the following reasons depending on duration of the power interruption, and a voltage value and duration of instantaneous voltage drop.

(1) A primary power voltage monitoring circuit is unable to detect a power shutdown or an instantaneous voltage drop because the duration of the power shutdown or duration of the voltage drop is shorter than detection limits of the circuit.

(2) Power is not interrupted because the voltage of each unit does not sufficiently drops in response to the power shutdown or the instantaneous voltage drop because of electric capacitance of each unit.

(3) Depending on the electric capacitance of each unit, the secondary power voltage drops only in part of the functional unit 910 in response to the power shutdown or the instantaneous voltage drop. Although a monitoring circuit for the secondary power voltage does not detect the power shutdown, part of IC becomes inoperative (in a reset state) due the power voltage drop.

The above cases (1) and (2) are not overcome by setting a threshold in a monitoring voltage. Since each unit is subject to variations in performance, a startup order cannot be determined. Even if a monitoring control unit fails to detect a power shutdown in the primary power, each functional unit may detect the power shutdown in the primary power. The unit suffering from the primary power shutdown also stops outputting the secondary power voltage. A secondary power monitoring circuit detects an abnormal state, and sends a reset control signal to each function executing circuit (IC or the like), thereby setting each circuit to an initial state.

If the primary power is not interrupted in the monitoring control unit 920 but is shut down only in the functional unit 910 in the case of the causes (1) and (2), each function executing circuit 914 remains reset. The initial setting process is performed on the functional unit 910 for operation only if the monitoring control unit 920 gives an instruction.

However, the monitoring control unit 920 with the primary power in normal state is unable to detect the failure taking place in the functional unit 910. So, the functional unit 910 remains inoperative instead of shifting to be operative. If the functional unit 910 continuously remains inoperative, the monitoring control unit 920 fails to learn what happens in the functional unit 910. As a result, although the functional unit 910 is simply inoperative due to the temporary power interruption, the monitoring control unit 920 may determine that the functional unit 910 is faulty.

In the apparatus including a plurality of functional units 910, one of the power failures (1) and (2) may occur, causing the primary power to be shut down in the monitoring control unit 920. In that case, after restoring from the primary power shut down state, the monitoring control unit 920 performs an initial setting process to each functional unit 910 for normal operation. A reference clock may be supplied to each of the plurality of functional units 910 among which an initial setting order is defined. In such a case, the initial setting process must be performed on the plurality of functional units 910 in the defined order. If the primary power is shut down in only the functional unit 910 that requires the initial setting first, the initial setting process is performed only on the functional unit 910 requiring the initial setting first, while a functional unit 910 requiring the initial setting later has already undergone the initial setting process and remains operative. This does not follow the initial setting order. As a result, the apparatus as a whole becomes inoperative.

In the case of the failure (3), the initial setting process for shifting to an operative state is performed on some of function executing circuits 914 included in the functional unit 910, and the monitoring control unit 920 cannot learn what happens in the functional unit 910. In this case, as well, the initial setting process for shifting to an operative state is not performed appropriately. As a result, although the functional unit 910 is in a temporary power failure, the monitoring control unit 920 may determine that the functional unit 910 is faulty.

SUMMARY OF THE INVENTION

Accordingly, it is an object of the present invention to provide a method and apparatus for monitoring a power failure in an apparatus containing at least one functional unit which executes a predetermined function, by monitoring the power failure in at least one function executing section contained in each functional unit, and for restoring the functional unit.

In accordance with one embodiment of the present invention, a method of monitoring a power failure in an apparatus including at least one functional unit for performing a predetermined function, includes the steps of providing the functional unit with at least one function executing section for performing the predetermined function, setting a first setting value on a status notification register included in the function executing section when the function execution section shifts to a reset state just after restoration from a power failure, setting in the status notification register a second setting value different from the first setting value when the function execution section shifts to an operative state just after performing initial setting process on the function executing section, determining that the power failure has occurred in the function executing section when a value of the status notification register is the first setting value, and determining that the function executing section is in an operative state when a value of the status notification register is the second setting value.

For example, at least one circuit (such as an IC) is formed as a function executing section as a per function basis, and a status notification register storing a state is arranged on a per function executing section. By determining each of two stored values set in the status notification register, a determination is made as to whether a power failure takes place in the functional unit containing the function executing section, and the function executing section suffering from the power failure is restored back to an operative state.

The power failure monitoring method may further include the steps of providing initial setting order information representing the order of initial setting processes on a plurality of functional units included in the apparatus, searching the plurality of functional units for a inoperative functional unit which is a functional unit not in an operative state, on the basis of the initial setting order information, by checking a value of the status notification register included in each of the plurality of functional units, selecting the inoperative functional unit which has been firstly found on the basis of the initial setting order information as an initial setting target functional unit, determining whether a subsequent functional unit which is a functional unit subsequent to the initial setting target functional unit is in an operative state, shifting the subsequent functional unit to a reset state when the subsequent functional unit is in an operative state, and performing the initial setting process on the initial setting target functional unit.

Even if the startup order of the plurality of functional units forming the apparatus is defined, the startup order is correctly detected when the power failure takes place, and the functional units are started in the defined startup order to restore the apparatus to an operative state.

The power failure monitoring method may further include steps of transmitting an initial setting complete signal representing a state of initial setting process on each function executing section, from the function executing section at a preceding position to the function executing section at a subsequent position, in a predetermined order starting from a leading position within the functional unit, and determining an occurrence of a power failure in the functional unit on the basis of content of the initial setting complete signal output from the function executing section at a last position in the predetermined order.

Even when the functional unit contains a plurality of function executing sections, the power failure in the entire functional unit is generally detected by monitoring the initial setting complete signal without monitoring individually the function executing sections.

The apparatus includes a monitoring control unit for monitoring and controlling at least one functional unit, a status notification register storing an operational state on a per function executing section contained in the function unit. The function executing section is made of at least one IC. By continuously monitoring the status notification register, the monitoring control unit reliably identifies whether the function executing section is in an operative state or in a reset release state subsequent to the restoration after the occurrence of a power failure. Accordingly, the function executing section having suffered from a power failure can be restored to an operative state by performing an initial setting process.

Even if the apparatus includes a plurality of functional units and the initial setting order of the plurality of functional units is defined, the initial setting process can be performed in a correct order. The whole apparatus can thus be restored to be normal in the event of a temporary power failure.

BRIEF DESCRIPTION OF THE DRAWINGS

FIG. 4 diagrammatically illustrates a reset control signal in accordance with the first embodiment of the present invention.

FIG. 11 illustrates an example of a relationship between the state of the functional unit and the order of the initial setting in the case of three functional units.

DESCRIPTION OF THE PREFERRED EMBODIMENTS

Figure 1:
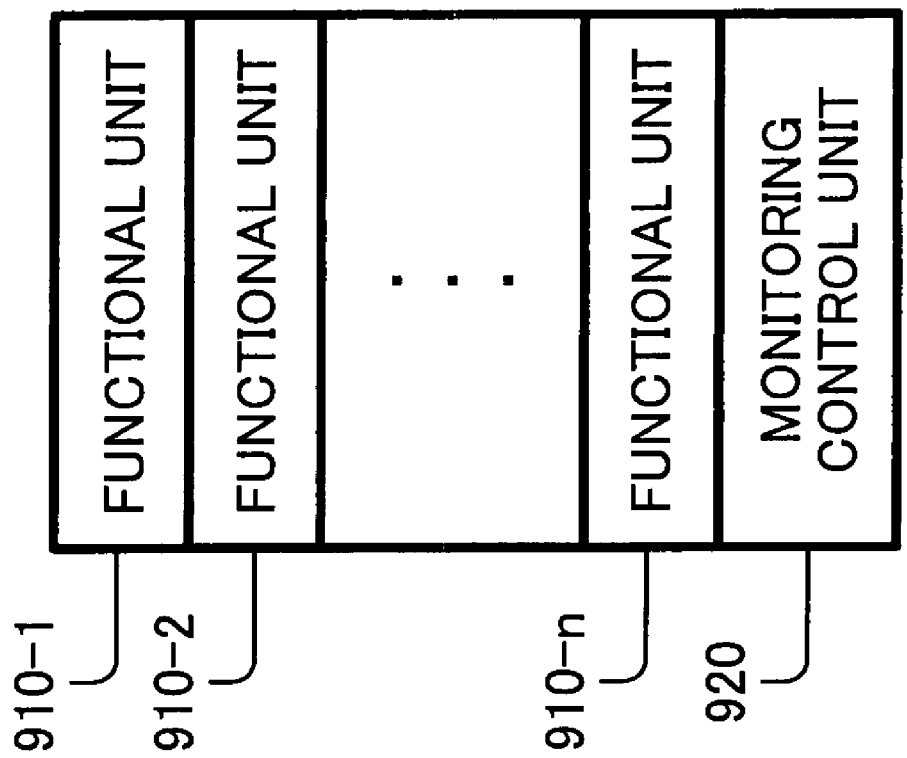
FIG. 1 illustrates a relationship between an apparatus and a functional unit.
Figure 2:
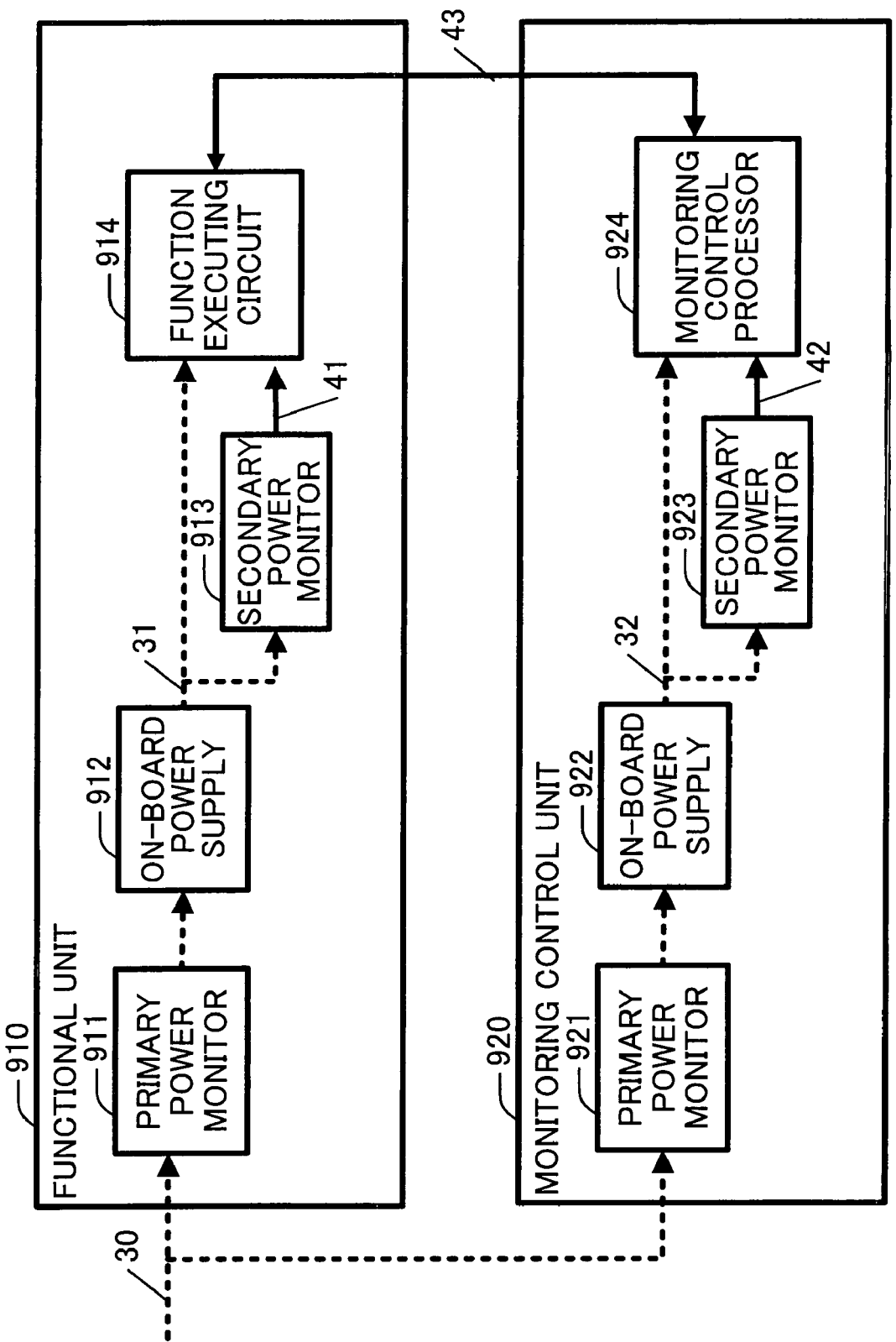
FIG. 2 illustrates an example of a functional unit in a known apparatus.
Figure 3:
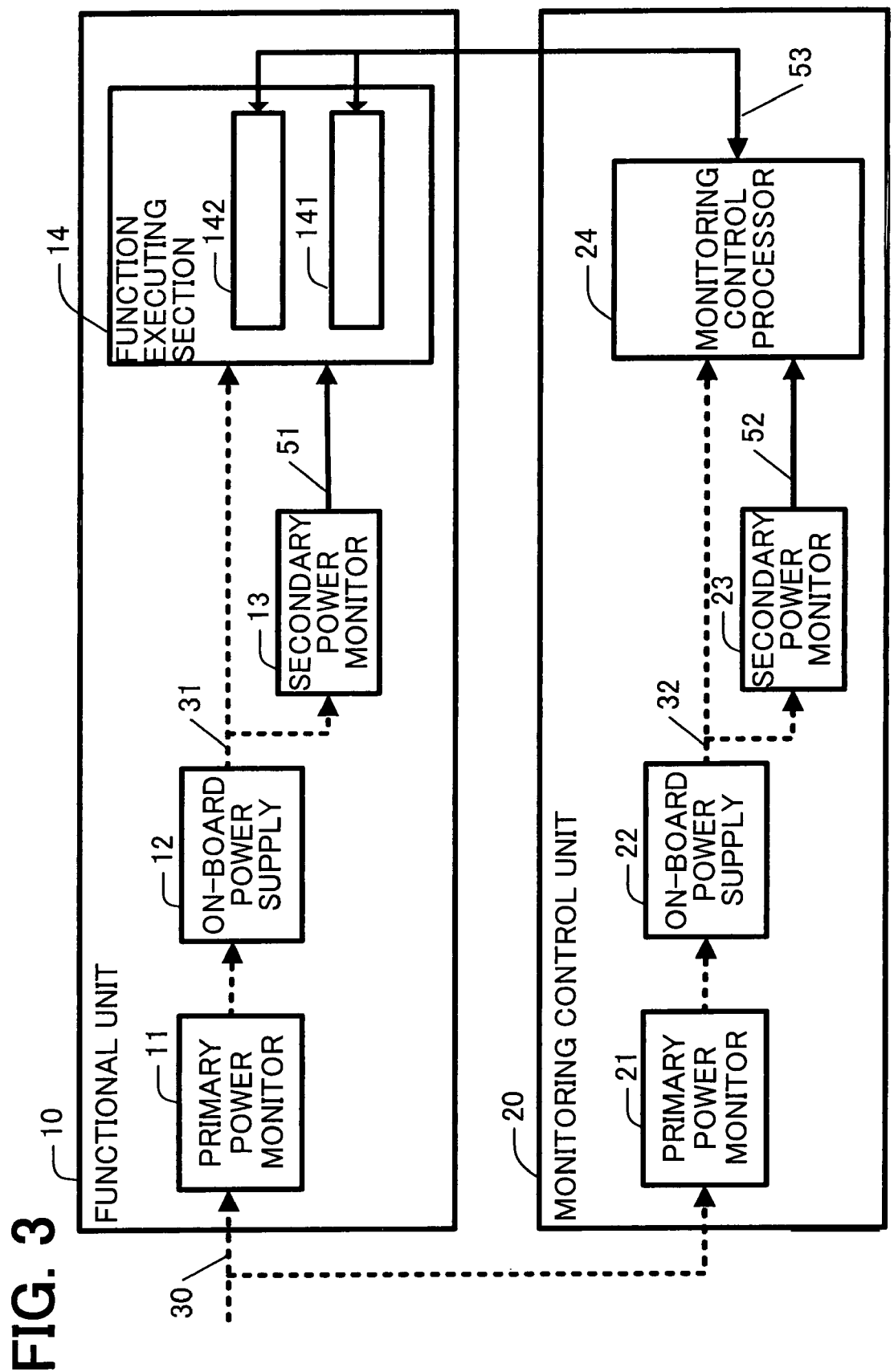
FIG. 3 shows a configuration of an apparatus in accordance with a first embodiment of the present invention.

FIG. 3 shows a configuration of an apparatus in accordance with a first embodiment of the present invention. As the apparatus of FIG. 1, the apparatus of the first embodiment of the present invention includes at least one functional unit 10 and a monitoring control unit 20 for monitoring and controlling the at least one functional unit 10. For simplicity, a single functional unit 10 is shown, but the discussion here is also applicable even if a plurality of functional units 10 are used.

The functional unit 10 installed in the apparatus includes a primary power monitor 11, an on-board power supply 12 (for generating secondary power from primary power), a secondary power monitor 13 (for monitoring a secondary power voltage and generating a reset control signal), and a function executing section 14.

The function executing section 14 includes an initial value setting register 142 for setting a required initial value for rendering the function executing section 14 operative, and a status notification register 141 for storing a value indicating a status of the function executing section 14.

Upon being supplied with the primary power from a power facility during a normal operation, each functional unit 10 monitors primary power 30 therewithin. When the primary power voltage reaches a specified voltage in each functional unit 10, the on-board power supply 12 generates and supplies secondary power 31. The secondary power monitor 13 monitors the voltage of the secondary power 31, and activates and outputs the reset control signal 51 (ON-state) to the function executing circuit 14 if a power failure is monitored. Upon receiving the activated reset control signal 51, the function executing section 14 sets the internal circuit thereof to an initial state, and sets a first setting value in the status notification register 141. This state is referred to as a reset state. In the reset state, the function executing section 14 is locked in operation, and the monitoring control unit 20 is unable to write any data onto the status notification register 141 and the initial value setting register 142. When power is restored to a normal state, the secondary power monitor 13 deactivates the reset control signal 51 (into a reset release signal). Upon receiving the reset release signal, the function executing section 14 shifts into a reset release state and starts operation. But the function executing section 14 is not yet in a normal operating state to perform the full function thereof. The function executing section 14 shifts to the normal operating state only after an initial value is set in the initial value setting register 142 and a predetermined value is set in the status notification register 141 in response to an instruction from the monitoring control unit 20.

The status notification register 141 in the function executing section 14 is a register set by the monitoring control unit 20. Upon completing the setting of the initial value on the initial value setting register 142 in the function executing section 14 in the reset release state, the monitoring control unit 20 writes on the status notification register 141 a second setting value different from the first setting value set at the moment the function executing section 14 shifts into the reset state. In the discussion that follows, the second setting value is also referred to as an initial setting complete value. The first setting value set at the moment of shifting into the reset state is not necessary unique. A plurality of values may be used, and any value within a predetermined range may be used. The initial setting complete value is beforehand defined as a value different from the first setting value. The status notification register 141 permits no values other than the first and second setting values to be set therewithin.

When the reset control signal 51 from the secondary power monitor 13 is activated (ON-state), the function executing section 14 shift to the reset state, i.e., the function executing section 14 is locked in operation permitting no writing operation of the monitoring control unit 20 to be performed on the status notification register 141 and the initial value setting register 142. However, in the case of a power shutdown or power drop in the secondary power 31 that escapes detection of the secondary power monitor 13, the function executing section 14 can be in the reset state even when the reset control signal 51 from the secondary power monitor 13 remains deactivated (OFF-state). In such a case, the first setting value is set in the status notification register 141 by the function executing section 14.

The monitoring control unit 20 in the apparatus includes a primary power monitor 21, an on-board power supply 22 (for generating secondary power from primary power), a secondary power monitor 23 (for monitoring a secondary power voltage and generating a reset control signal), and a monitoring control processor 24.

Upon being supplied with the primary power 30 from the power facility during a normal operation, the monitoring control unit 20 monitors the voltage of the primary power 30. When the voltage of the primary power 30 reaches a specified voltage in each functional unit 20, the on-board power supply 22 generates and supplies secondary power 32. The monitoring control unit 20 monitors the voltage of the secondary power 32, and activates and outputs a reset control signal 52 to the monitoring control processor 24 if a power failure is monitored in the secondary power 32. Upon receiving the activated reset control signal 52, the monitoring control processor 24 sets the internal circuit thereof to an initial state. When the secondary power 32 is restored to a normal operating state, the secondary power monitor 23 deactivates the reset control signal 52 (reset release signal) and sends the reset release signal to the monitoring control processor 24. Upon receiving the reset release signal, the monitoring control processor 24 starts a monitoring control process thereof.

The function executing section 14 in the functional unit 10 can be made of at least one integrated circuit (IC) and include one or more pairs of status notification register 141 and initial value setting register 142 depending on the number of ICs. For example, a single status notification register 141 may be arranged for a plurality of ICs, and the states of the plurality of ICs may be collected and stored on the status notification register 141. Alternatively, one status notification register 141 may be arranged for each IC. In the latter case that one status notification register 141 is arranged for each IC, the function executing section 14 is determined to be operative when all status notification registers 141 contained in the function executing section 14 are set at the initial setting complete value. When at least one of the status notification registers 141 contained in the function executing section 14 is not set at the initial setting complete value, the function executing section 14 is determined to be inoperative.

A plurality of function executing sections 14 may be used for the functional unit 10 to perform a plurality of functions. The configuration in such a case will be described later with reference to FIG. 8.

Figure 4:
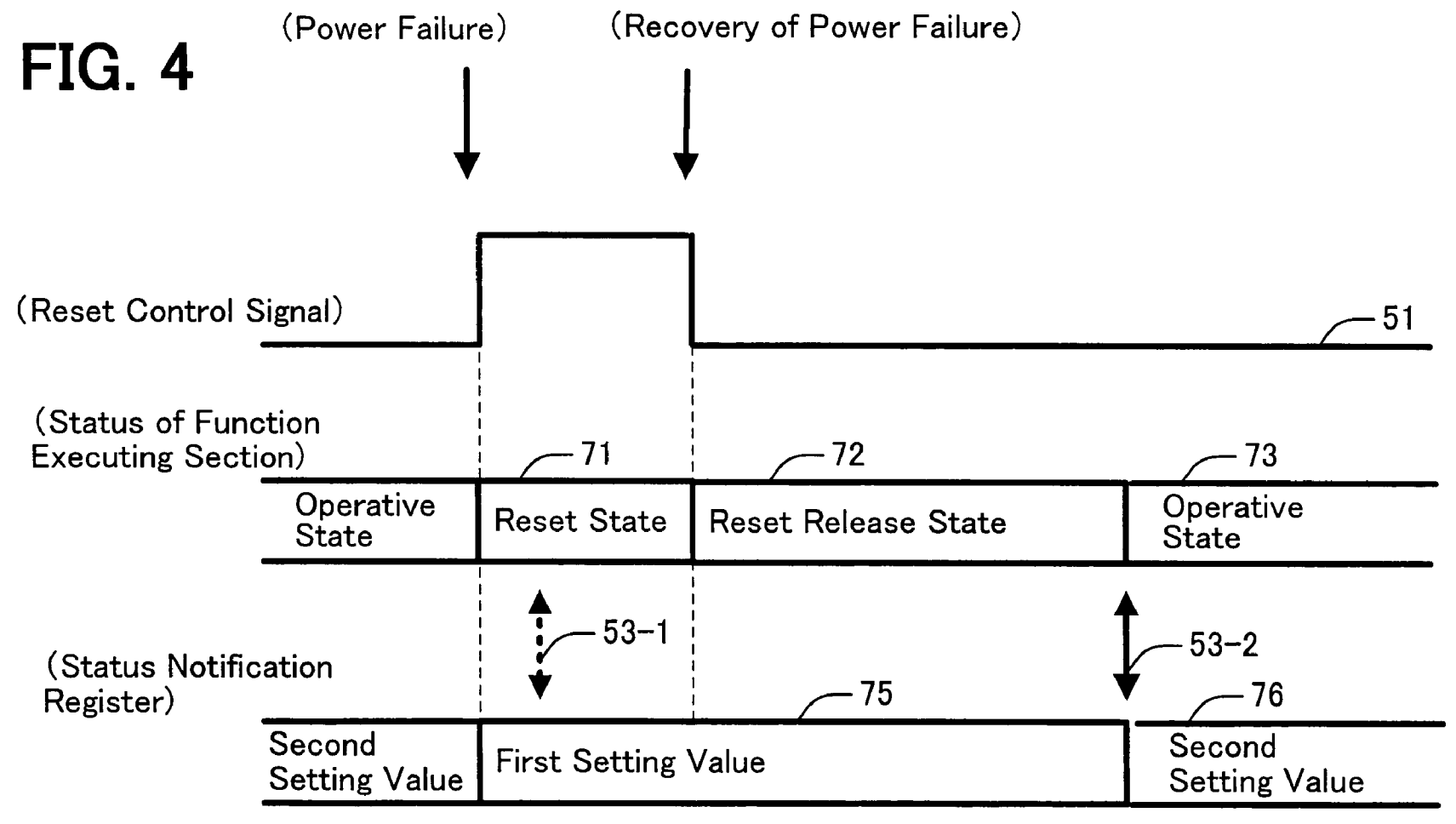

FIG. 4 diagrammatically illustrates timing relationship of the reset control signal 51, the status of the function executing section and the value of the status notification register.

Upon detecting a power failure, the secondary power monitor 13 activates a reset control signal 51 (from OFF-state to ON-state) and outputs the activated reset control signal 51 to the function executing section 14. When the reset control signal 51 is activated (from OFF-state to ON-state), the function executing section 14 shifts into a reset state 71 and a first setting value 75 is set in the status notification register 141. In the reset state 71, the function executing section 14 does not accept instructions, from the monitoring control unit 20, of writing into the initial value setting register 142 and the status notification register 141. The reset state 71 is released when the reset control signal 51 is deactivated (from ON-state to OFF-state) with power restored from the power failure, and the function executing section 14 shifts into a reset release state 72. In the reset release state 72, the function executing section 14 accepts a monitoring control signal 53-2, from the monitoring control unit 20, of writing into the initial value setting register 142 and the status notification register 141, and shifts into an operative state 73. At the same time, a second setting value 76 different from the first setting value 75 is set on the status notification register 141 in response to the monitoring control signal 53-2.

Figure 5:
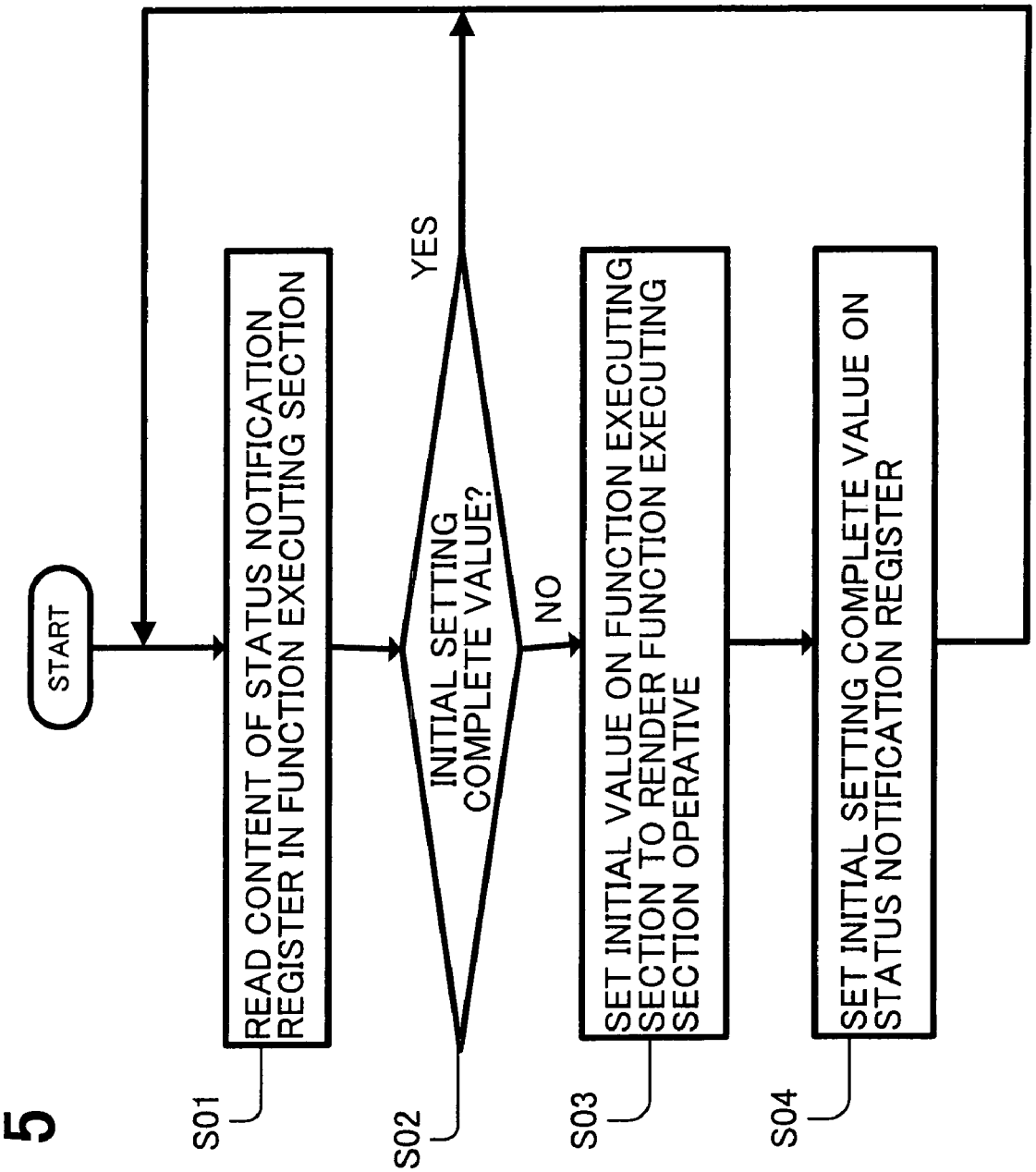
FIG. 5 is a flowchart showing an example of a monitoring control process in accordance with a first embodiment of the present invention.

FIG. 5 is a flowchart showing an example of a monitoring control process in accordance with a first embodiment of the present invention. The monitoring control process is performed by the monitoring control processor 24 in the monitoring control unit 20.

In step S01, the monitoring control processor 24 accesses the functional unit 10 using a monitoring control signal 53 to monitor the state of the functional unit 10. The monitoring control processor 24 then reads the content of the status notification register 141 in the function executing section 14.

In step S02, the monitoring control processor 24 determines whether the content of the status notification register 141 read in step S01 is a predetermined initial setting complete value. If it is determined that the read content is the predetermined initial setting complete value (YES in step S02), the functional unit 10 is already operative, requiring no restoration process and processing returns to step S01 to continue to monitor the occurrence of a power failure in the functional unit 10. If the content of the status notification register 141 is not the predetermined initial setting complete value (NO in step S02), processing proceeds to step S03.

In step S03, the value to be set on the status notification register 141 is one of two values, i.e., a first setting value to be set on the status notification register 141 when the function executing section 14 is shifted into a reset state, and a second setting value (initial setting complete value) to be set when an initial setting process performed by the monitoring control unit 20 is completed. If the content of the status notification register 141 is not the initial setting complete value, the value currently set on the status notification register 141 must be the first setting value. More specifically, it is considered that the function executing section 14 is in one of the reset state and the reset release state subsequent to the occurrence of a power failure.

To render the function executing section 14 operative, the monitoring control processor 24 in the monitoring control unit 20 sets on the initial value setting register 142 in the function executing section 14 an initial value, which is needed to shift into an operative state, using the monitoring control signal 53.

In step S04, the monitoring control processor 24 sets the second setting value (or the initial setting complete value) different from the first setting value on the status notification register 141 in order to indicate that the initial setting process in step S03 on the function executing section 14 has been completed and that the function executing section 14 is now operative, and then processing returns to step S01 to continue to monitor the occurrence of any power failure in the functional unit 10.

The setting process on the initial value setting register 142 and the status notification register 141 in steps S03 and S04 cannot be completed normally when the function executing section 14 is still in the reset state. The setting process, however, can be completed normally by one of known methods, for example, by waiting for a predetermined period of time and retrying the setting process until the reset state is released.

The monitoring control unit 20, in this way, monitors the status notification register 141 arranged in the function executing section 14 of the functional unit 10. Even if an instantaneous power shutdown or an instantaneous power drop takes place in the primary power in the power facility, and then the secondary power monitor 13 detects a subsequent power failure in the functional unit 10, the monitoring control unit 20 can control the function unit 10 to shift into a normal operating state, by timely detecting a subsequent restoration of the primary power to a standard level.

In the case that a plurality of functional units 10 are used with no initial setting process order defined thereamong, the above-described process can be performed individually to each functional unit 10.

Figure 6:
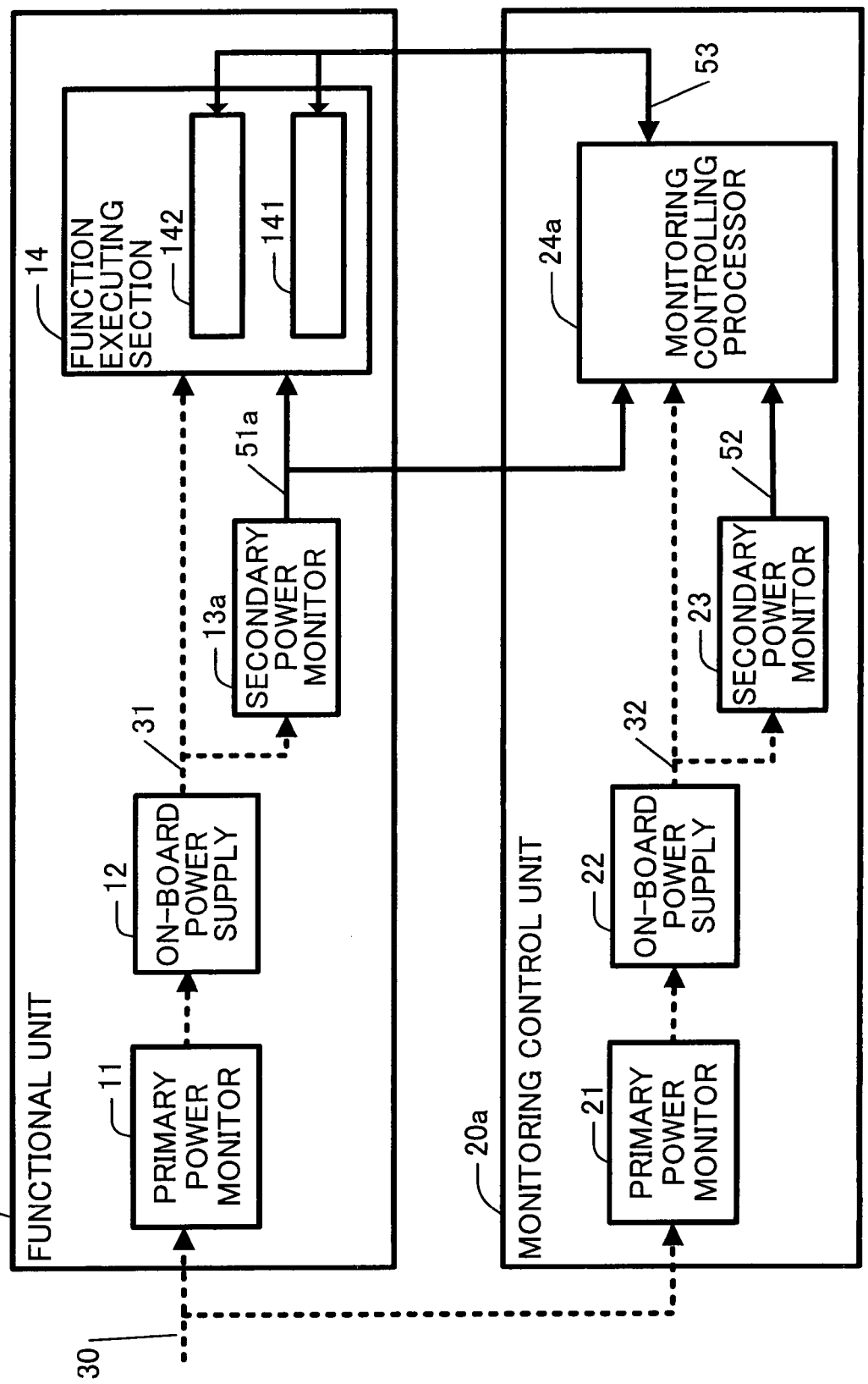
FIG. 6 illustrates a first exemplary configuration of the apparatus in accordance with a second embodiment of the present invention.

FIG. 6 illustrates a first exemplary configuration of the apparatus in accordance with a second embodiment of the present invention. In accordance with the second embodiment, a functional unit 10a sends a reset control signal 51a to a monitoring control unit 20a. The monitoring control unit 20a monitors the state of the functional unit 10a more precisely, thereby efficiently performing the restoration process on the functional unit 10a.

As in the first embodiment of the present invention, the functional unit 10a includes a primary power monitor 11, an on-board power supply 12 (for generating secondary power from primary power), a secondary power monitor 13a (for monitoring a secondary power voltage and generating the reset control signal 51a), and a function executing section 14. The second embodiment is different from the first embodiment in that the secondary power monitor 13a also outputs the reset control signal 51a to a monitoring control processor 24a in the monitoring control unit 20a in parallel.

As in the first embodiment, upon being supplied with the primary power from the power facility during a normal operation, each functional unit 10a monitors primary power 30 therewithin. When the primary power voltage reaches a specified voltage in each functional unit 10a, the on-board power supply 12 generates secondary power 31 and starts supplying the secondary power 31 to the function executing section 14. The secondary power monitor 13a monitors the voltage of the secondary power 31, and activates and outputs the reset control signal 51a (ON-state) to the function executing section 14 if a power failure is monitored. Upon receiving the activated reset control signal 51a, the function executing section 14 sets the internal circuit thereof to an initial state and shifts to a reset state, where the first setting value is set in the status notification register 141.

When the power is restored back to a normal operating state, the secondary power monitor 13 deactivates the reset control signal 51a (into a reset release state) and sends the deactivated reset control signal 51a (or a reset release signal) to each of the function executing section 14 and the monitoring control unit 20a. Upon receiving the reset release signal, the function executing section 14 shifts into a reset release state and waits on standby for an initial setting from the monitoring control unit 20a. And the function executing section 14 shifts to an operative state when the monitoring control unit 20a sets an initial value on the initial value setting register 142 and the initial setting complete value, or the second setting value different from the first setting value, on the status notification register 141.

As in the first embodiment, the monitoring control unit 20a in the apparatus includes a primary power monitor 21, an on-board power supply 22 (for generating secondary power from primary power), a secondary power monitor 23 (for monitoring a secondary power voltage and generating a reset control signal).

The second embodiment is different from the first embodiment in that the monitoring control processor 24a directly receives and monitors the reset control signal 51a from the secondary power monitor 13a in the functional unit 10a. By monitoring the reset control signal 51a input from the functional unit 10a, the monitoring control processor 24a can avoid setting the initial value onto the initial value setting register 142 in the function executing section 14 that remains in the reset state and unable to shift to an operative state. The monitoring control processor 24a can thus perform the monitoring control process on the functional unit 10a more efficiently. Although FIG. 6 illustrates a single functional unit 10a, the operation of the apparatus remains unchanged even if a plurality of functional units 10a are employed.

Figure 7:
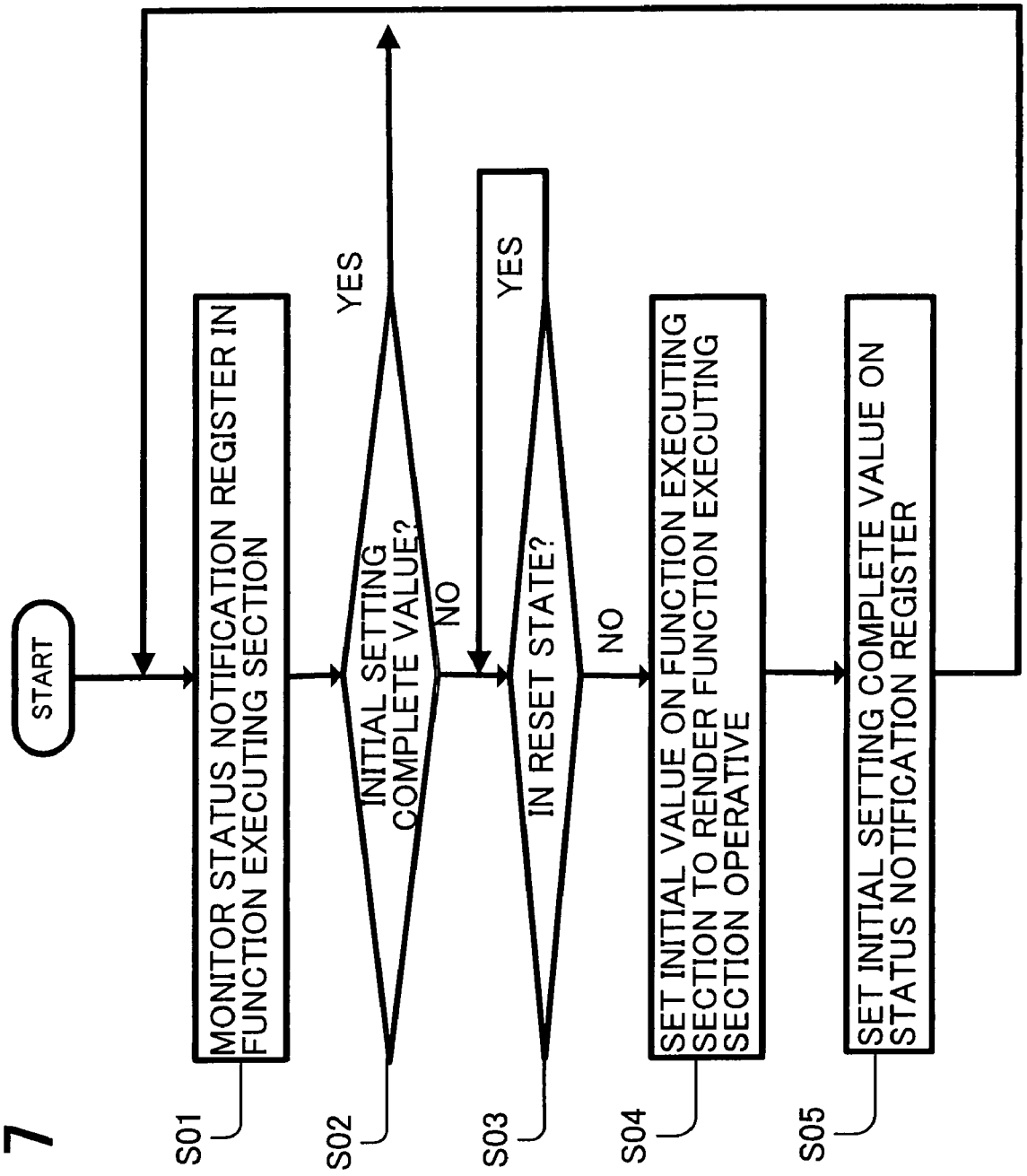
FIG. 7 is a first exemplary flowchart of a monitoring control process, in accordance with the second embodiment of the present invention.

FIG. 7 is a first exemplary flowchart of a monitoring control process, in accordance with the second embodiment of the present invention, which is performed by the monitoring control processor 24a in the monitoring control unit 20a in FIG. 6.

In step S01, the monitoring control processor 24a accesses the functional unit 10a using the monitoring control signal 53 to monitor the state of the functional unit 10a. The monitoring control processor 24a then reads the content of the status notification register 141 in the function executing section 14.

In step S02, the monitoring control processor 24a determines whether the content of the status notification register 141 read in step S01 is a predetermined initial setting complete value. If it is determined that the read content is the predetermined initial setting complete value (YES in step S02), which indicates that the functional unit 10a is already operative and no restoration process is needed, processing returns to step S01 to continue to monitor the occurrence of a power failure in the functional unit 10a. If the content of the status notification register 141 is not the predetermined initial setting complete value (NO in step S02), which indicates an occurrence of a power failure, processing proceeds to step S03 in order to restore the power failure.

The value to be set on the status notification register 141 is one of two values, i.e., a first setting value to be set on the status notification register 141 when the function executing section 14 is shifted into a reset state, and a second setting value (initial setting complete value) to be set when an initial setting process performed by the monitoring control unit 20a is completed. If the content of the status notification register 141 is not the initial setting complete value, the value currently set on the status notification register 141 must be the first setting value. In other words, it is determined that the function executing section 14 is in the reset state or the reset release state due to the occurrence of a power failure.

In step S03, the monitoring control processor 24a checks the reset control signal 51a output from the secondary power monitor 13a in the functional unit 10a to determine whether the function executing section 14 is in the reset state. If the reset control signal 51a is activated, i.e., if the function executing section 14 is in the reset state (YES in step S03), processing returns to step S03 to wait for a release of the reset state. If the reset control signal 51a is deactivated, i.e., if the function executing section 14 is in the reset release state (NO in step S03), processing proceeds to step S04 to perform the initial setting process.

A period of time of the power failure is not known and a period of time of reset state is not known, either. The initial value setting register 142 in the function executing section 14 does not accept the setting in the reset state (the function executing section 14 does not accept an instruction for initial setting from the monitoring control unit 20a). Because of these reasons, the monitoring control processor 24a waits for a release of the reset state of the function executing section 14 to cause the instruction for initial setting from the monitoring control processor 24a to be surely accepted by the function executing section 14.

In step S04, to render the function executing section 14 operative, the monitoring control processor 24a in the monitoring control unit 20a sets on the initial value setting register 142 in the function executing section 14 an initial value. At this moment, the function executing section 14 is in the rest release state, and the initial value is reliably set on the initial value setting register 142 by the monitoring control unit 20a using the monitoring control signal 53.

In step S05, because the initial setting process in step S04 has been completed onto the function executing section 14, the monitoring control processor 24a sets the second setting value different from the first setting value, i.e., the initial setting complete value, on the status notification register 141 to shift the function executing section 14 into an operative state. And then processing returns to step S01 to continue to monitor the occurrence of a power failure.

As described above, the monitoring control unit 20a constantly monitors the status notification register 141 arranged in each function executing section 14 in the functional unit 10a while monitoring the reset control signal 51a output from the functional unit 10a at the same time. Even if an instantaneous power shutdown or an instantaneous power drop takes place in the primary power in the power facility, and then the secondary power monitor 13a detects a subsequent power failure in the functional unit 10a, a subsequent restoration of the primary power to a standard level is immediately detected. The monitoring control unit 20a waits on standby until the function executing section 14 becomes fully ready to receive the initial setting instruction from the monitoring control unit 20a. With the function executing section 14 ready to receive the initial setting instruction, the monitoring control unit 20a causes the functional unit 10a to shift to an operative state.

In the case that a plurality of functional units 10a are used with no initial setting process order defined among the functional units 10a, the above-described process is performed to each functional unit 10a.

Figure 8:
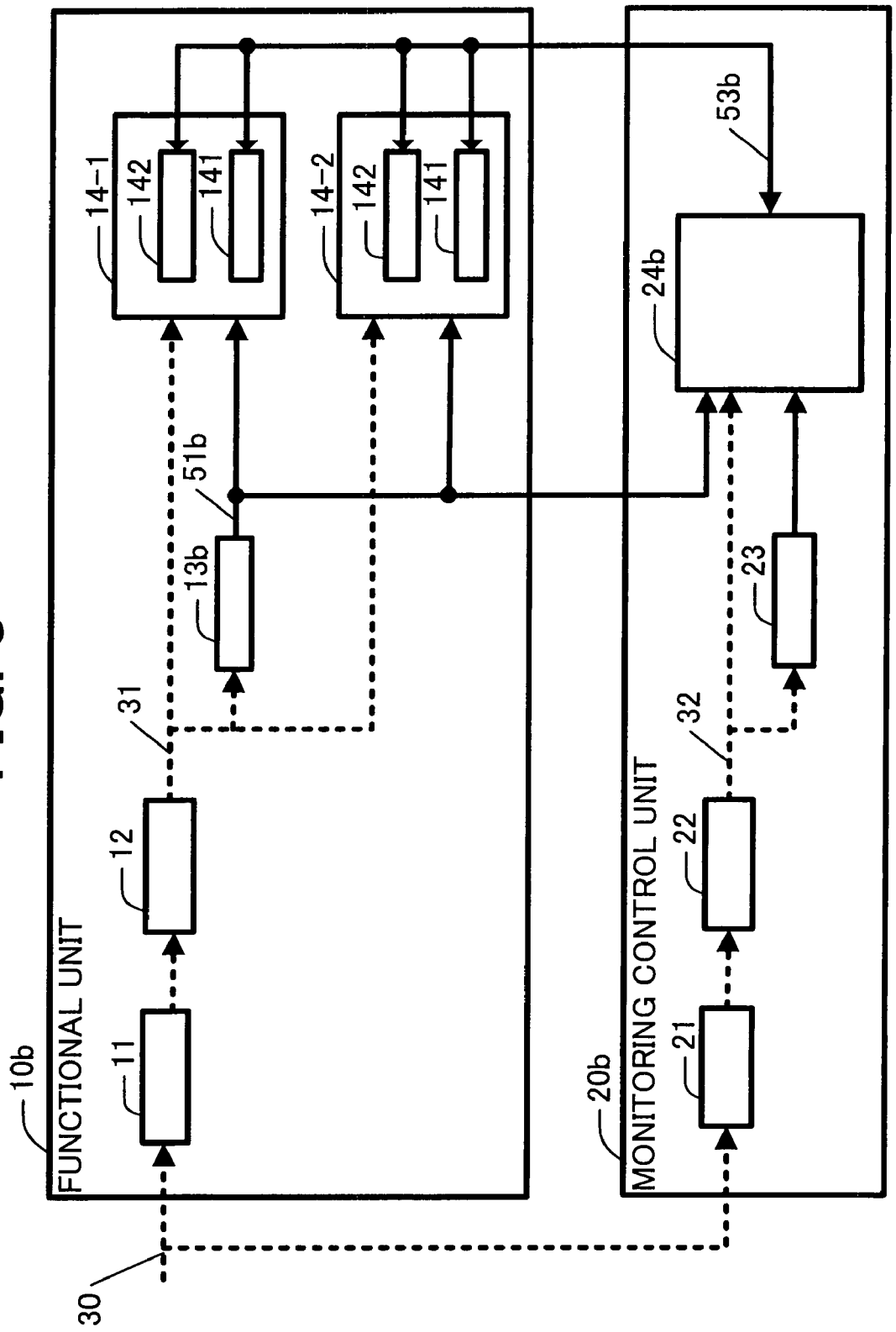
FIG. 8 illustrates a second exemplary configuration of the apparatus in accordance with the second embodiment of the present invention.

FIG. 8 illustrates a second exemplary configuration of the apparatus in accordance with the second embodiment of the present invention, where the functional unit includes a plurality of function executing sections. As in the first exemplary configuration of the apparatus in accordance with the second embodiment shown in FIG. 6, the functional unit 10b in the apparatus includes a primary power monitor 11, an on-board power supply 12 (for generating secondary power from primary power), a secondary power monitor 13b (for monitoring a secondary power voltage and generating a reset control signal), and function executing sections 14 (for performing the function of the functional unit). Unlike the first exemplary configuration shown in FIG. 6, however, a plurality of function executing sections 14 are employed. FIG. 8 illustrates two function executing sections 14-1 and 14-2. A reset control signal 51b output from the secondary power monitor 13b is also output to each of the function executing sections 14-1 and 14-2 and the monitoring control unit 20b. Each of the function executing sections 14-1 and 14-2 includes an initial value setting register 142 for performing the initial setting process on the function executing section 14 and a status notification register 141 for indicating the completion of the setting of the initial value onto the initial value setting register 142.

Depending of capacitance of each functional unit, a particular function executing section may shift to a reset state due to a power voltage drop although the secondary power monitor 13b fails to detect a power shutdown, for example, when a secondary power voltage drops in only part of the function executing sections in the functional unit as a result of a power shutdown or a power voltage drop. Even in such a case, providing each of multiple function executing sections 14 with a status notification register 141 allows the monitoring control unit 20b to detect the function executing section 14 which is in a reset state.

Upon being supplied with the primary power from the power facility during a normal operation, each functional unit 10b monitors primary power 30 therewithin. When the primary power voltage reaches a specified voltage in each functional unit 10b, the on-board power supply 12 generates secondary power 31 and starts supplying the secondary power 31 to the function executing section 14. The functional unit 10b monitors the voltage of the secondary power 31, and activates and outputs a reset control signal 51b to the function executing sections 14-1, 14-2 and the monitoring control unit 20b when a power failure is monitored. Upon receiving the activated reset control signal 51b, each of the function executing sections 14-1 and 14-2 sets the internal circuit thereof to an initial state and sets the first setting value onto the status notification register 141, thereby indicating that the corresponding function executing section is in a reset state.

When the power is restored back to a normal operating state, the secondary power monitor 13b deactivates the reset control signal 51b (as a reset release signal) and sends the reset release signal to each of the function executing sections 14-1, 14-2 and the monitoring control unit 20b. Upon receiving the reset release signal, each of the function executing sections 14-1 and 14-2 shifts into a reset release state and is ready to accept the initial setting process from the monitoring control unit 20b.

As in the first exemplary configuration, the monitoring control unit 20b in the apparatus includes a primary power monitor 21, an on-board power supply 22 (for generating secondary power from primary power), a secondary power monitor 23 (for monitoring a secondary power voltage and generating a reset control signal), and a monitoring control processor 24b. In this arrangement, the setting process is performed on each of the initial value setting register 142 and the status notification register 141 in each of the plurality of function executing sections (14-1 and 14-2 in FIG. 8) in the single functional unit 10b.

Although FIG. 8 illustrates the single functional unit for convenience of explanation, the above discussion is also applicable when a plurality of functional units are employed.

Figure 9:
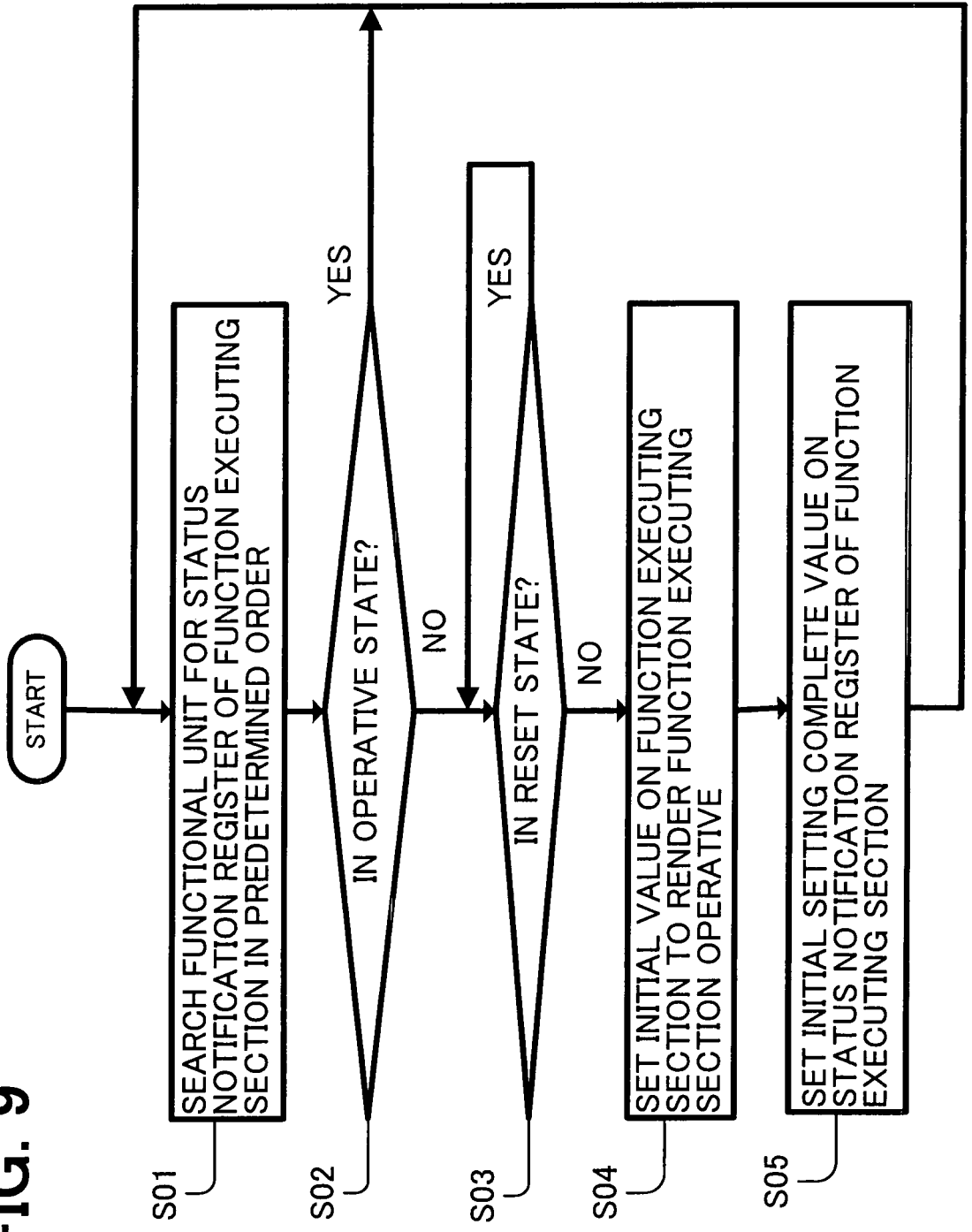
FIG. 9 is a second exemplary flowchart of the monitoring control process, in accordance with the second embodiment of the present invention.

FIG. 9 is a second exemplary flowchart of the monitoring control process, in accordance with the second embodiment of the present invention, which is performed by the monitoring control processor 24b in the monitoring control unit 20b in FIG. 8, wherein a plurality of function executing sections are employed in the functional unit.

In step S01, the monitoring control processor 24b searches all function executing sections 14 required for operation of the functional unit 10b, in a predetermined order, and reads and checks the content of the status notification register 141 in each function executing section 14.

In step S02, the monitoring control processor 24b determines whether the content of the status notification register 141 read in step S01 is a predetermined initial setting complete value (a second setting value), or whether the function executing sections 14 is in operative state. If it is determined that the function executing sections 14 is in operative state (YES in step S02), processing returns to step S01 to search a next function executing section 14.

If the content of the status notification register 141 is not the predetermined initial setting complete value, namely the function executing section 14 is not operative (NO in step S02), it is determined that a power failure has took place in the function executing section 14, and processing proceeds to step S03 to perform a restoration process.

In step S03, the monitoring control processor 24b monitors a reset control signal 51b output from the secondary power monitor 13b in the functional unit 10b. If the reset control signal 51b is activated, namely in the reset state (YES in step S03), processing returns to step S03 to wait on standby until the reset control signal 51b is deactivated (into a reset release state).

The reset control signal 51b in the reset state means that the function executing section 14 having received the same reset control signal 51b is also in the reset state. In the reset state, the function executing section 14 does not accept the setting from the monitoring control unit 20b, in other words, the monitoring control unit 20b cannot set the initial value on the initial value setting register 142. For this reason, the monitoring control processor 24b waits on standby for a release of the reset state in the function executing section 14.

If the reset control signal 51b is deactivated, namely, the reset control signal 51b is not in the reset state (NO in step S03), processing proceeds to step S04 to perform the initial setting process.

In step S04, the monitoring control unit 20b sets the initial value onto the initial value setting register 142 in the function executing section 14. Since the function executing section 14 is in the reset release state at this moment, the initial value is reliably set onto the initial value setting register 142 in the function executing section 14.

In step S05, an initial setting complete value as the second setting value different from the first setting value is set onto the status notification register 141 in the function executing section 14 to shift the function executing section 14 into the operative state. Processing returns to step S01 to search a next function executing section 14 and continue to monitor a power failure.

Through the above process, all function executing sections 14 in a power failure can be restored and shift to an operative state even when the plurality of function executing sections 14 are contained in the functional 10b. More specifically, even in the case that the functional unit 10b includes the plurality of function executing sections 14, the monitoring control unit 20b always detects an abnormal state in the power in the functional unit 10b when a power shutdown takes place in any functional unit 10b due to a power shutdown or a power voltage drop in the primary power in the power facility.

After the power in the power facility is restored, even when any particular function executing section 14 changes into a reset state for some reason, the function executing section 14 can be restored to a normal operating state because the state of the function executing section 14 is constantly monitored by the monitoring control unit 20b.

In the case that a plurality of functional units 10b are used with no initial setting process order defined among the functional units 10b, the above-described process can be performed to each functional unit 10b.

Figure 10:
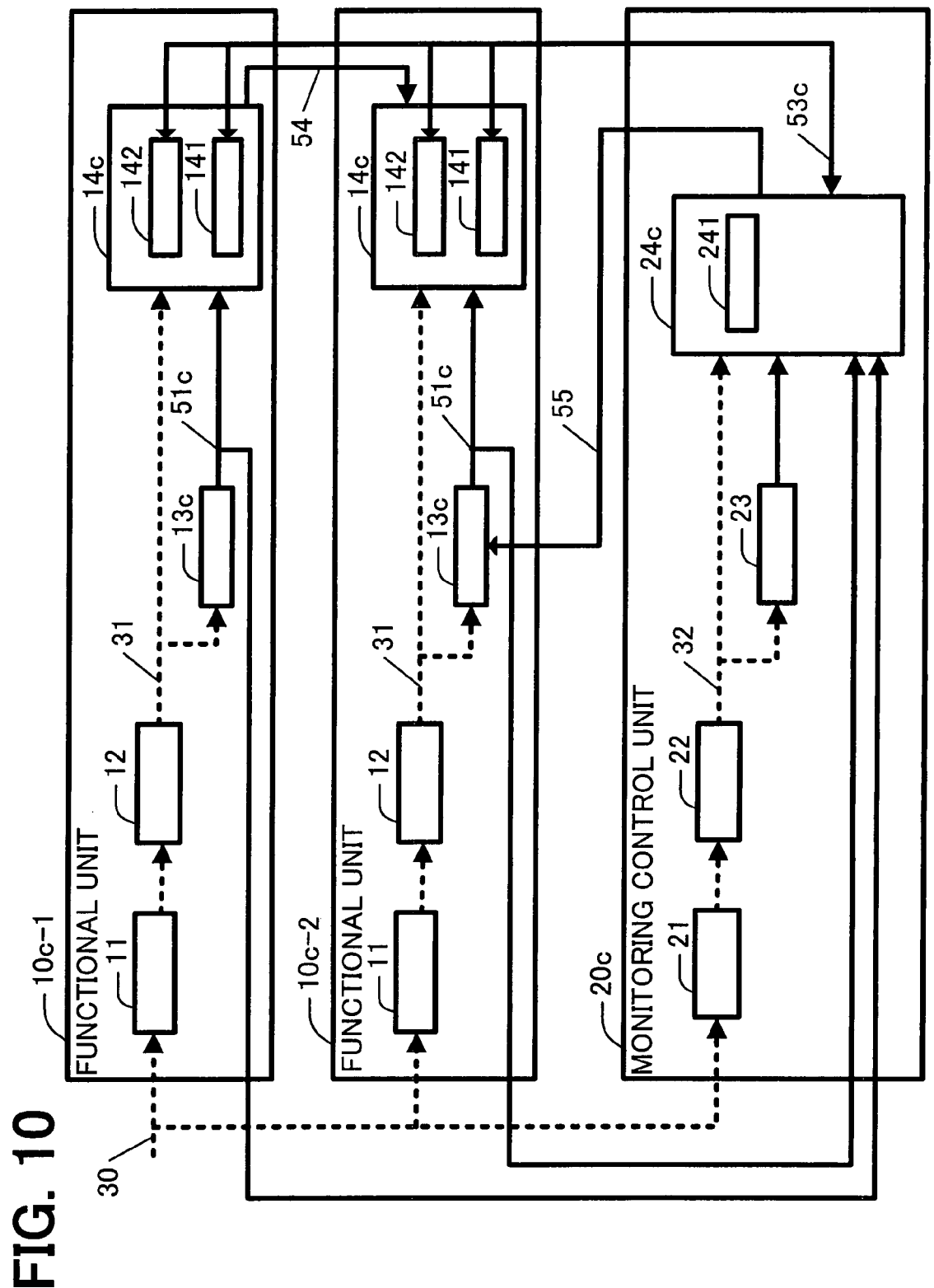
FIG. 10 illustrates a exemplary configuration of the apparatus in accordance with the third embodiment of the present invention.

FIG. 10 illustrates an exemplary configuration of the apparatus in accordance with the third embodiment of the present invention, where the initial setting order of the functional units is predetermined among the functional units. In this case, the initial setting process is performed in the order of a functional unit 10c-1 to a functional unit 10c-2.

As in the second embodiment, the functional unit 10c-1 in the apparatus includes a primary power monitor 11, an on-board power supply 12 (for generating secondary power from primary power), a secondary power monitor 13c (for monitoring a secondary power voltage and generating a reset control signal), and a function executing section 14c. A reset control signal 51c is supplied to each of a function executing section 14c and a monitoring control unit 20c. The function executing section 14c includes a status notification register 141 and an initial value setting register 142.

Similarly, the functional unit 10c-2 in the apparatus includes a primary power monitor 11, an on-board power supply 12 (for generating secondary power from primary power), a secondary power monitor 13c (for monitoring a secondary power voltage and generating a reset control signal), and a function executing section 14c. A reset control signal 51c is supplied to each of a function executing section 14c and a monitoring control unit 20c.

The apparatus of the third embodiment is different from the apparatus of the second embodiment in that the functional unit 10c-1 outputs a reference signal 54 (such as clock) to the functional unit 10c-2 and that the monitoring control unit 20c outputs a reset control signal 55 to the functional unit 10c-2.

The reference signal 54 input to the function executing section 14c in the functional unit 10c-2 needs to be stabilized when the function executing section 14c is released from the reset state thereof. The function executing section 14c in the functional unit 10c-2 references the reference signal 54. If the reference signal 54 is not stabilized, the operation of the function executing section 14c in the functional unit 10c-2 also becomes unstable, and the function executing section 14c may shift into an abnormal state, becoming unable to operate normally. For this reason, the initial setting process order is set among the functional units. The initial setting process order may be arranged so that after the functional unit 10c-1 starts and becomes operative with the reference signal 54 stabilized, the functional unit 10c-2 starts and becomes operative.

As described above, in accordance with the third embodiment, the initial setting process order of the plurality of functional units is determined beforehand, for example, on the basis of the reference relations of a reference signal 54 among functional units 10c.

As in the second embodiment, the monitoring control unit 20c in the apparatus includes a primary power monitor 21, an on-board power supply 22 (for generating secondary power from primary power), a secondary power monitor 23 (for monitoring a secondary power voltage and generating a reset control signal), and a monitoring control processor 24c. The third embodiment is different from the second embodiment in that the monitoring control processor 24c receives a plurality of reset control signals 51c from a plurality of functional units 10c and perform the initial setting process on the plurality of functional units 10c in a predetermined order. To this end, the monitoring control unit 20c includes an initial setting order storage 241 for storing the order of the initial setting. In accordance with the order set beforehand in the initial setting order storage 241, the monitoring control unit 20c performs the initial setting process on the functional units 10c. To perform the order control, the reset control signal 55 is provided and reset control is performed on the functional unit 10c-2 using the reset control signal 55. In the order control process, the functional unit at the first position requires no reset control as will be described later in connection with a monitoring control process. As shown in FIG. 10, the reset control signal 55 from the monitoring control unit 20c is not connected to the functional unit 10c-1 in the first position.

In FIG. 10, only two functional units are depicted for convenience of explanation, but the number of functional units is not limited to two and the apparatus may be composed of any number of functional units. In such a case, functional units 10c-3, . . . , 10c-n, each having the same structure as the functional unit 10c-2, are cascaded between the functional unit 10c-2 and the monitoring control unit 20c. The reference signal 54 is also connected from the functional unit 10c-2 to the functional unit 10c-3, from the functional unit 10c-3 to the functional unit 10c-4, . . . , to the functional unit 10c-n. The functional units 10c-1, 10c-2, . . . , 10c-n undergo the initial setting process in that order, and shift to the operative state in that order.

FIG. 11 illustrates an example of a relationship between the state of the functional unit and the order of the initial setting in the case of three functional units. The three functional units are referred to as UNIT-1, 2, and 3, for example. Combinations 801-808 of the three functional units UNIT-1, 2, and 3 listed on a functional unit column 810 are mapped to the initial setting order on a column 820.

Table 800 shows that, when the states of the functional units are searched in the predetermined initial setting order (UNIT-1, 2, and 3), the initial setting process need to be performed on a functional unit that is found first to be in the reset state and functional units subsequent to the first functional unit, in the order of the initial setting order shown in the column 820. For example, in the combination entry 807, the functional unit UNIT-1, which is found first to be in the reset position, and functional units following the functional unit UNIT-1 should be set in the predetermined initial setting order (UNIT-1, 2, and 3 in the column 820), or in the order of UNIT-1, UNIT-2 and UNIT-3.

It should be noted that although the initial setting is performed, for example, on the UNIT-1, 2, and 3 in that order in the combination entry 805, UNIT-2 in an operative state must be reset prior to the initial setting of UNIT-1. For example, in the case that UNIT-2 receives a reference signal from UNIT-1, if the initial setting process is performed on UNIT-1 with UNIT-2 in an operative state, an unstable reference signal may be supplied from UNIT-1 to UNIT-2, thereby possibly causing UNIT-2 to be in an abnormal state.

Figure 12:
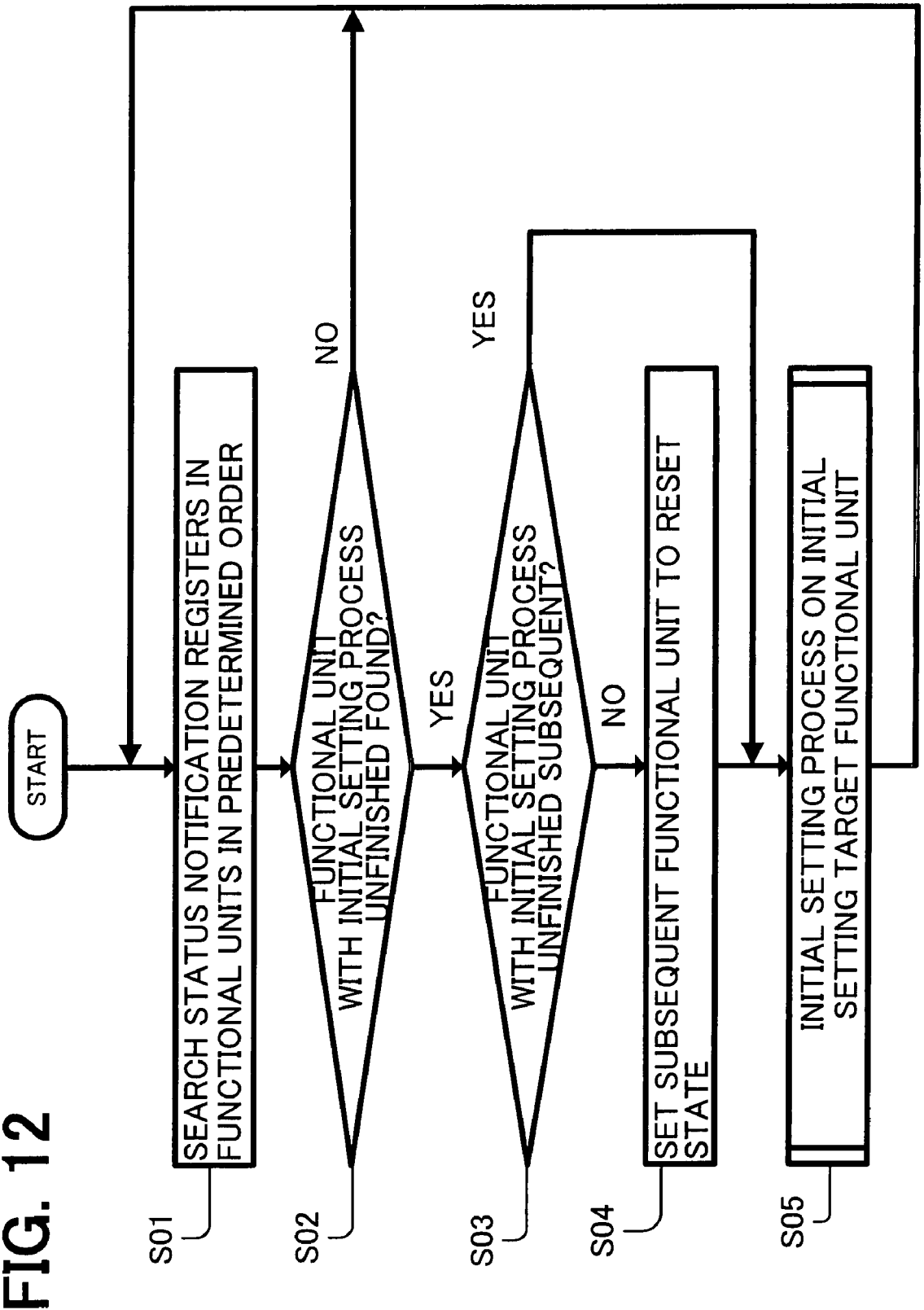
FIG. 12 is an example of a flowchart illustrating a monitoring control process in accordance with the third embodiment of the present invention.

FIG. 12 is an example of a flowchart illustrating a monitoring control process in accordance with the third embodiment of the present invention, which is performed on the plurality of functional units with the initial setting order defined therebetween, by the monitoring control processor 24$c$ in the monitoring control unit 20$c$.

In step S01, the monitoring control processor 24$c$ searches the status notification registers 141 in the functional units 10$c$ in accordance with the predetermined order set in the initial setting order storage 241, and reads the content of each status notification register 141. The monitoring control processor 24$c$ checks whether the initial setting complete value as the second setting value indicating the completion of the initial setting process is stored.

In the case that the reference signal 54 for use in each functional unit is supplied serially from one to next, the functional unit should be set to be in an operative state after the supplied reference signal 54 is stabilized. In such a case, the order of the supply of the reference signal 54 can be set to be the predetermined order and pre-registered in the initial setting order storage 241.

In step S02, the monitoring control processor 24$c$ determines whether any functional unit 10$c$ with the initial setting complete value not set therewithin (functional unit with the initial setting process unfinished) is found, in the search of the status notification registers 141 in the predetermined order in step S01.

If there is no functional unit 10$c$ with the initial setting complete value not set therewithin (NO in step S02), i.e., all functional units 10$c$ have undergone the initial setting process and are in an operative state, processing returns to step S01 to continue to monitor the occurrence of a functional unit 10$c$ with the initial setting process unfinished.

If a functional unit 10$c$ with the initial setting process unfinished is found (YES in step S02), processing proceeds to step S03, where the found functional unit 10$c$ is regarded as an initial setting target functional unit.

In step S03, the status notification register 141 in the functional unit 10$c$ subsequent in order to the initial setting target functional unit found in step S02 is read. The monitoring control processor 24$c$ determines whether the initial setting process has been completed on the subsequent functional unit 10$c$.

If the functional unit 10$c$ has not yet completed the initial setting process (YES in step S03), processing proceeds to step S05 to perform the initial setting process on the functional unit 10$c$.

If the functional unit 10$c$ has completed the initial setting process and is in an operative state (NO in step S03), processing proceeds to step S04.

In step S04, the monitoring control processor 24$c$ sets a subsequent functional unit 10$c$ to a reset state using the reset control signal 55. This is because, to perform the initial setting process on the initial setting target functional unit 10$c$ found in step S02, the initial setting process should be performed again, in accordance with the predetermined order, on the functional unit 10$c$ which is in the operative state and subsequent to the initial setting target functional unit 10$c$.

In step S05, the initial setting process is performed on the initial setting target functional unit 10$c$ after the subsequent functional unit 10$c$ is set to be in a reset state in step S04.

Processing returns to step S01 to monitor the occurrence of a functional unit 10$c$ with the initial setting process unfinished. Step S05 will be described in detail with reference to FIG. 13.

The monitoring control process is performed on each functional unit 10$c$ as in the above-described process steps. The initial setting process is performed on the functional units 10$c$ in accordance with the predetermined startup order of the functional units. In this way, the apparatus including the plurality of functional units 10$c$ is restored from a power failure to a normal operating state.

In the case that the functional unit 10$c$ includes a plurality of function executing sections 14$c$, the monitoring control processor 24$c$ can determine in step S02 whether the functional unit including the plurality of function executing sections has completed the initial setting process. If all operative function executing sections have completed the initial setting process, the monitoring control processor 24$c$ can determine that the functional unit has completed the initial setting process. If otherwise, the monitoring control processor 24$c$ can determine that the functional unit has not completed the initial setting process.

Figure 13:
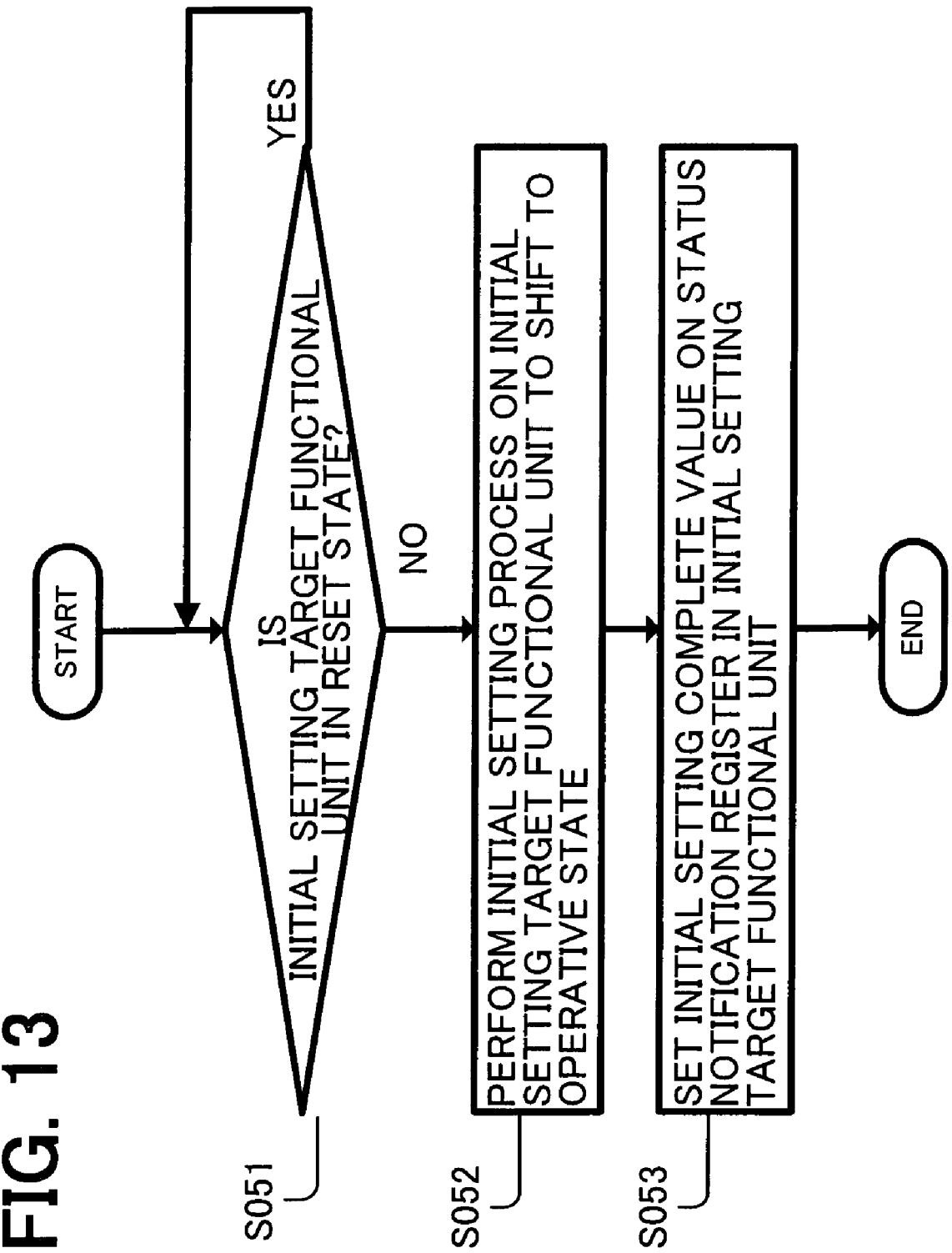
FIG. 13 is an example of a flowchart of the monitoring control process in accordance with the third embodiment of the present invention.

FIG. 13 is a flowchart of step S05 in the monitoring control process of FIG. 12 in accordance with the third embodiment of the present invention.

In step S051, the monitoring control processor 24$c$ determines whether the initial setting target functional unit 10$c$ is in a reset state.

If the initial setting target functional unit 10$c$ is in a reset state (YES in step S051), processing returns to step S051 to wait on standby for a release of the reset state.

If the initial setting target functional unit 10$c$ is not in a reset state (NO in step S051), the initial setting target functional unit 10$c$ is now released out of the reset state and processing proceeds to step S052 to perform the initial setting process.

In step S052, the monitoring control processor 24$c$ performs the initial setting process on the function executing section 14$c$ in the initial setting target functional unit 10$c$. More specifically, an initial value required to shift to an operative state is set on the initial value setting register 142 in the function executing section 14$c$ in the initial setting target functional unit 10$c$.

In step S053, the monitoring control processor 24$c$ sets the initial setting complete value as the second setting value on the status notification register 141 in the function executing section 14$c$ in the initial setting target functional unit 10$c$, thereby setting the function executing section 14$c$ to an operative state. Processing now ends.

As shown in the monitoring control process of FIGS. 12 and 13, the reset control is performed on the functional unit subsequent to the functional unit with initial setting process unfinished, which has been found first among the column of functional units in the predetermined order. Therefore, the reset control is not necessary on the functional unit 10 at the first position in the predetermined order, and the functional unit 10 at the first position needs no function to receive the reset control signal 55 from the monitoring control unit 20c.

In accordance with the third embodiment of the present invention, in the case that the apparatus includes the plurality of functional units 10c with the initial setting order defined thereamong, even if a temporary power shutdown or a power voltage drop takes place in the primary power in the power facility, causing a power failure in the functional unit, the monitoring control unit 20c can constantly detect a disorder in the power in the functional unit 10c. After the power is restored in the power facility, the initial setting process is performed on the functional units 10c in the predetermined order, causing the functional units 10c to operate normally. As a result, the whole apparatus can resume a normal operation.

Figure 14:
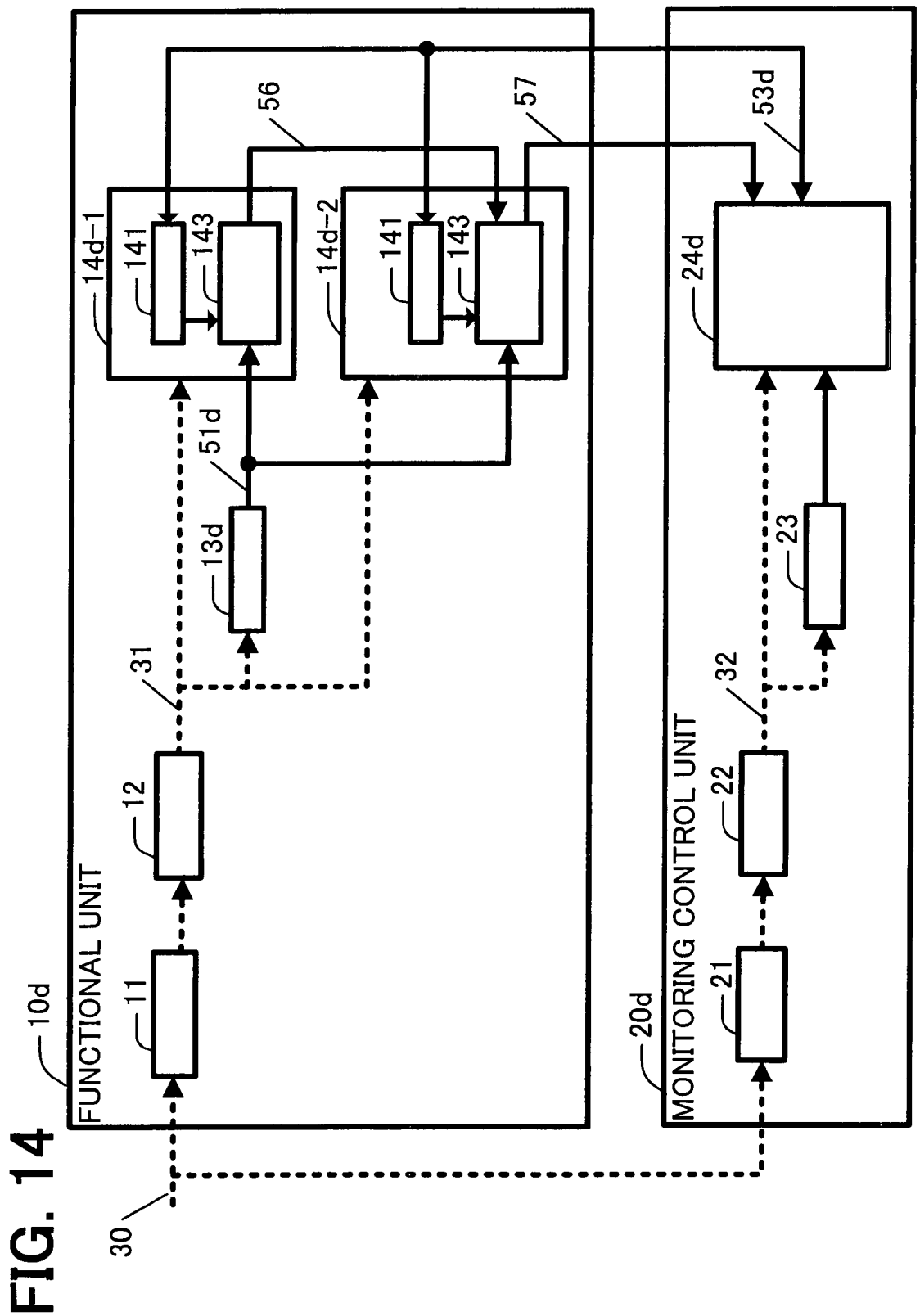
FIG. 14 illustrates an exemplary configuration of the apparatus in accordance with a fourth embodiment of the present invention.

FIG. 14 illustrates an exemplary configuration of the apparatus in accordance with a fourth embodiment of the present invention. In this case, a functional unit 10d includes at least one function executing section 14d which has a function of determining whether each function executing section 14d has completed the initial setting process, and outputting an initial setting complete signal in response to the determination.

The functional unit 10d includes a primary power monitor 11, an on-board power supply 12 (for generating secondary power from primary power), a secondary power monitor 13d (for monitoring a secondary power voltage and generating a reset control signal), and function executing sections 14d-1 and 14d-2. An initial setting complete signal 56 is transferred between a plurality of function executing sections 14d to indicate the state of each function executing section 14d (whether each function executing section 14d is in a reset state or an initial setting complete state). FIG. 14 shows a case where the functional unit 10d includes two function executing sections 14d-1 and 14d-2, but any number (for example, n) of function executing sections 14d may be employed. In this case, the initial setting complete signal 56 is used to connect the function executing sections 14d-1, 14d-2, . . . , 14d-n. The initial setting complete signal 56 is not input to the function executing section 14d-1 at the first position in the predetermined order. In the second and subsequent function executing sections 14d-2, . . . , 14d-n, an initial setting complete signal 56, which is input from a preceding function executing section 14d, and an initial setting complete signal 56, which is output to a subsequent function executing section 14d, are present. The initial setting complete signal 56 output from the function executing section 14d-n at the last position in the predetermined order is input to the monitoring control unit 20d.

Unlike the second embodiment, the function executing section 14d further includes an initial setting determiner 143. For simplicity, the initial value setting register 142 set by the monitoring control unit 20d in the initial setting of the function executing section 14d is not shown. No reset control signal 51d is output from the secondary power monitor 13d to the monitoring control unit 20d.

Based on the following states (1), (2), and (3), the initial setting determiner 143 determines whether the initial setting process on the function executing section 14d has been completed:

(1) input state of the reset control signal 51d;

(2) state of the initial setting complete signal 56 input to one function executing section 14d from a function executing section 14d preceding in a predetermined order;

(3) value of the status notification register 141 set by the monitoring control unit 20d.

The initial setting complete signal 56 takes one of a first value set when the function executing section 14d is in the reset state, and a second value, set different from the first value, indicating the completion of the initial setting.

The initial setting determiner 143 monitors the above described states (1), (2), and (3). If the initial setting complete signal 56 input to one function executing section 14d from a function executing section 14d preceding in the predetermined order is the second value indicating the completion of the initial setting, the initial setting complete value has been set on the function executing section 14d by the monitoring control unit 20d, and the reset control signal 51d is deactivated (in the reset release state), the initial setting determiner 143 determines that the initial setting process has been completed on the preceding function executing section 14d. The initial setting determiner 143 then outputs to the subsequent function executing section 14d the initial setting complete signal 56 with the second value set indicating that the initial setting has been completed on the function executing section 14d.

The first value is not necessarily a single value. A plurality of first values may be used, or any value within a predetermined range may be used. The second value is set to be different from the first value.

Although the first value and the second value described above are different from the first setting value and the second setting value which are set in the status notification register 141, the first value and the second value may be configured to respectively equal the first setting value and the second setting value set in the status notification register 141.

If any of the three conditions (1), (2), and (3) is not satisfied, the initial setting complete signal 56 with the first value set therewithin is output to the subsequent function executing section 14d.

By connecting n function executing sections 14d-1 through 14d-n in a predetermined order using the initial setting complete signal, the function executing section 14d-n at the last position in the predetermined order outputs to the monitoring control unit 20d the initial setting complete signal 56, in which the second value is set only when the initial setting process has been completed on all function executing sections 14d for use in operation in the functional unit 10d.

The monitoring control unit 20d in the apparatus includes a primary power monitor 21, an on-board power supply 22 (for generating secondary power from primary power), a secondary power monitor 23 (for monitoring a secondary power voltage and generating a reset control signal), and a monitoring control processor 24d.

As described above, by determining the initial setting complete signal 56 from the function executing section 14d-n at the last position within the functional unit 10d, the monitoring control processor 24d can determine whether the initial setting process has been completed on all function executing sections 14*d*-1 through 14*d-n* available for use in the functional unit 10*d*, i.e., whether the functional unit 10*d* is operative.

Figure 15:
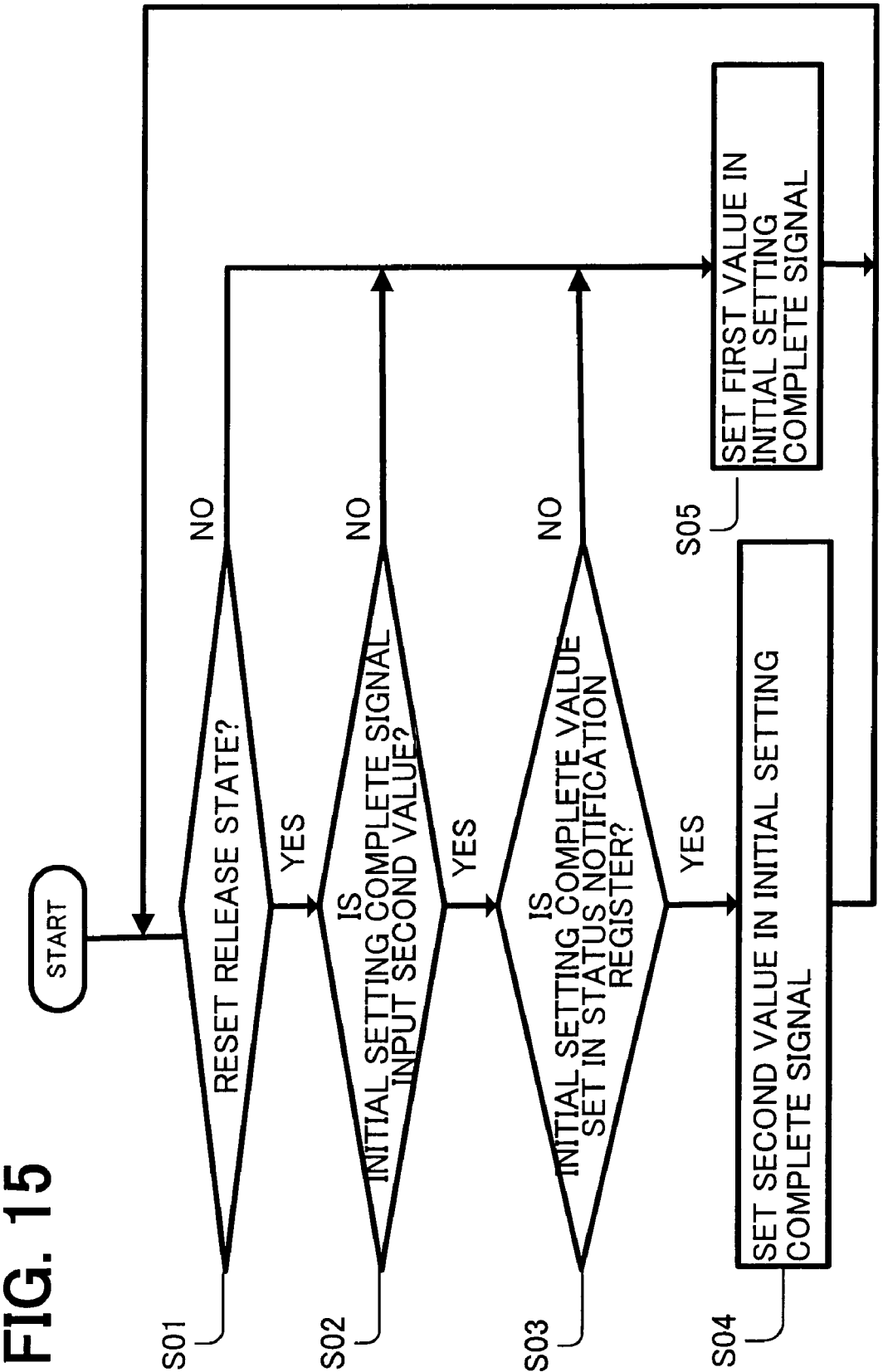
FIG. 15 is an exemplary flowchart illustrating operation of a function executing section in accordance with a fourth embodiment of the present invention.

FIG. 15 is an exemplary flowchart illustrating operation of one of the second and subsequent function executing sections 14*d* in accordance with the fourth embodiment of the present invention. (FIG. 14 is the flowchart of operation of the function executing section 14*d*-2.)

In step S01, the function executing section 14*d* checks the reset control signal 51*d* input to the function executing section 14*d* to determine whether the reset control signal 51*d* is in a reset release state.

If the reset control signal 51*d* is not in a reset release state (NO in step S01), i.e., the reset control signal 51*d* is in the reset state, which means that the initial setting process has not been performed on the function executing section 14*d*, processing proceeds to step S05.

If the reset control signal 51*d* is in the reset release state (YES in step S01), processing proceeds to step S02.

In step S02, the function executing section 14*d* determines whether the value of the initial setting complete signal 56 input from the function executing section 14*d* preceding in the predetermined order matches the second value.

If the value of the initial setting complete signal 56 is not the second value (NO in step S02), which means that the preceding function executing section 14*d* has not completed the initial setting, processing proceeds to step S05.

If the value of the initial setting complete signal 56 is the second value (YES in step S02), processing proceeds to step S03.

In step S03, the function executing section 14*d* determines whether the initial setting complete value from the monitoring control unit 20*d* is set in the status notification register 141 thereof.

If the initial setting complete value is not set in the status notification register 141 (NO in step S03), which means that the monitoring control unit 20*d* has not completed the initial setting complete value on the function executing section 14*d*, processing proceeds to step S05.

If the initial setting complete value is set in the status notification register 141 (YES in step S03), which means that the monitoring control unit 20 has completed the initial setting complete value on the function executing section 14*d*, processing proceeds to step S04.

In this case, the function executing section 14*d* is in a reset release state and has received the initial setting complete signal 56 with the second value set therewithin which indicates that the initial setting process on the function executing sections 14 preceding in the predetermined order has been completed, and the initial setting process on the function executing section 14*d* by the monitoring control unit 20*d* has completed.

Accordingly, in step S04, the function executing section 14*d* outputs, to a subsequent function executing section 14*d*, the initial setting complete signal 56 with the second value set therewithin which indicates that the initial setting process has been completed, and processing returns to step S01.

In this way, a signal which indicates that all function executing sections 14*d* preceding the current function executing section 14*d* is in a operative state is transferred to a subsequent function executing section 14*d*.

In step S05, the function executing section 14*d* sets the first value in the initial setting complete signal 56 indicating that the initial setting process has not been completed, and processing returns to step S01.

The process described above is that of the second and subsequent function executing sections 14*d*. The process of the function executing section 14*d* at the first position in the predetermined order can be performed by omitting step S02 described above.

In the above process, the function executing section 14*d* at the last position of the plurality of function executing sections 14*d*, which are connected via the initial setting complete signal in the predetermined order, outputs to the monitoring control unit 20*d* the initial setting complete signal 56 that summarizes the state of all function executing sections 14*d* contained in the functional unit 10*d*. In this way, the monitoring control unit 20*d* can learn the general status of the functional unit 10*d* by simply monitoring a single initial setting complete signal 56.

Figure 16:
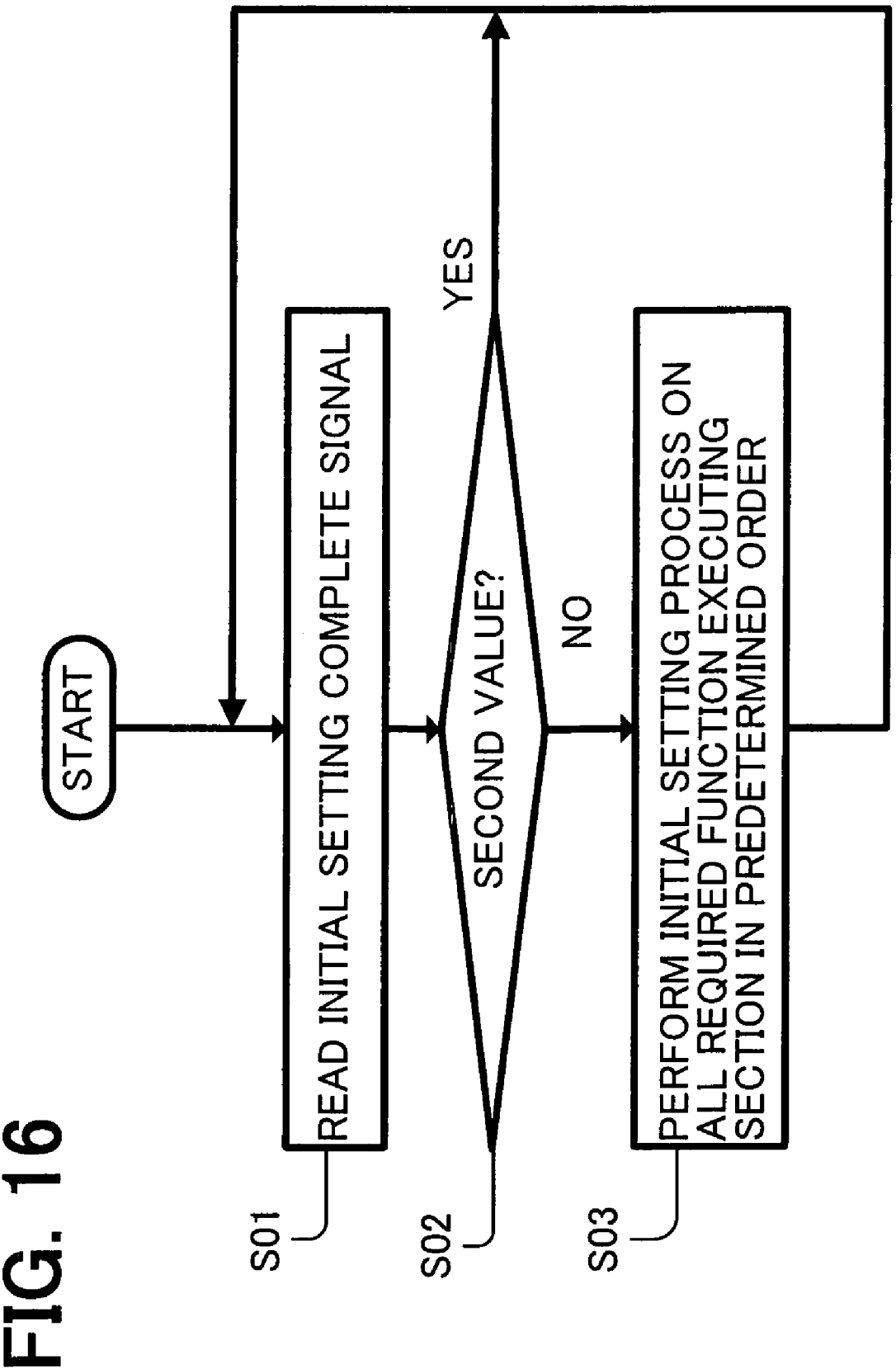
FIG. 16 is an exemplary flowchart of the monitoring control process in accordance with the fourth embodiment of the present invention.

FIG. 16 is an exemplary flowchart of the monitoring control process in accordance with the fourth embodiment of the present invention which is performed by the monitoring control processor 24*d* in the monitoring control unit 20*d*.

In step S01, the monitoring control processor 24*d* reads the value of the initial setting complete signal 56 input to the monitoring control unit 20*d* from the functional unit 10*d*.

In step S02, the monitoring control processor 24*d* checks whether the value of the initial setting complete signal 56 read in step S01 matches the predetermined second value.

If the value of the initial setting complete signal 56 matches the second value (YES in step S02), i.e., if all function executing sections 14*d* required for operation in the functional unit 10*d* are operative, processing returns to step S01 to continue to monitor the functional unit 10*d*.

If the value of the initial setting complete signal 56 is not the second value (NO in step S02), i.e., if at least one of the function executing sections 14*d* is not operative in the functional unit 10*d*, the monitoring control processor 24*d* determines that a power failure has taken place, and processing proceeds to step S03 to perform the restoration process.

In step S03, the monitoring control processor 24*d* performs the initial setting process on all required function executing sections 14*d* in the functional unit 10*d* and sets the initial setting complete value on the status notification registers 141 in the function executing sections 14*d*, and processing returns to step S01 to continue to monitor the functional units 10*d*.

In accordance with the fourth embodiment of the present invention, even if the functional unit 10*d* includes a plurality of function executing sections 14*d*, the monitoring control unit 20*d* monitors and restores efficiently a failure in the power which has took place in the functional unit 10*d* by monitoring a single initial setting complete signal.

What is claimed is:

1. A method of monitoring a power failure in an apparatus including at least one functional unit for performing a predetermined function, the method comprising:

providing the functional unit with at least one function executing section for performing the predetermined function;

setting a first setting value on a status notification register included in the function executing section when the function execution section shifts to a reset state just after restoration from a power failure;

setting in the status notification register a second setting value different from the first setting value when the function execution section shifts to an operative state just after performing initial setting process on the function executing section;

determining that the power failure has occurred in the function executing section when a value of the status notification register is the first setting value; and determining that the function executing section is in an operative state when a value of the status notification register is the second setting value.

2. The method of claim 1, further comprising:
supplying a reset control signal comprising an activated state and a deactivated state to the function executing section;
shifting the function executing section to a reset state in response to reception of the activated reset control signal, an operation of the function executing section being locked in the reset state;
shifting the function executing section to a reset release state in response to reception of the deactivated reset control signal, the operation of the function executing section being resumed in the reset release state;
monitoring the reset control signal; and
performing the initial setting process on the function executing section when the reset control signal is deactivated.

3. The method of claim 2, further comprising:
transmitting an initial setting complete signal representing a state of initial setting process on each function executing section, from the function executing section at a preceding position to the function executing section at a subsequent position, in a predetermined order starting from a leading position within the functional unit; and
determining an occurrence of a power failure in the functional unit on the basis of content of the initial setting complete signal output from the function executing section at a last position in the predetermined order.

4. The method of claim 3, further comprising:
setting a first value in the initial setting complete signal when the function executing section shifts to a reset state;
setting, by a first function executing section which is a function executing section at a leading position in the predetermined order, a second value different from the first value in the initial setting complete signal when the first function executing section is in a reset release state with the second setting value on the status notification register thereof; and
setting, by a second function executing section which is a function executing section at a position behind the leading position in the predetermined order, the second value in the initial setting complete signal when the second function executing section is in a reset release state with the second setting value in the status notification register thereof and has received from the function executing section at an immediately prior position in the predetermined order the initial setting complete signal with the second value set therein, wherein
it is determined that the functional unit is in operative state when the initial setting complete signal output from the function executing section at the last position in the predetermined order indicates the second value, and it is determined that a power failure has occurred in the functional unit when the initial setting complete signal output from the function executing section at the last position in the predetermined order indicates the first value.

5. The method of claim 1, further comprising:
determining that the functional unit is in a power failure when at least one function executing section included in the functional unit is determined to be in a power failure; and
determining that the functional unit is in an operative state when each of function executing sections included in the functional unit is in an operative state.

6. The method of claim 5, further comprising:
providing initial setting order information representing the order of initial setting processes on a plurality of functional units included in the apparatus;
searching the plurality of functional units for a inoperative functional unit which is a functional unit not in an operative state, on the basis of the initial setting order information, by checking a value of the status notification register included in each of a plurality of functional units;
selecting the inoperative functional unit which has been firstly found on the basis of the initial setting order information as an initial setting target functional unit;
determining whether a subsequent functional unit which is a functional unit subsequent to the initial setting target functional unit is in an operative state;
shifting the subsequent functional unit to a reset state when the subsequent functional unit is in an operative state; and
performing the initial setting process on the initial setting target functional unit.

7. An apparatus comprising:
at least one functional unit for performing a predetermined function;
at least one function executing section included in the functional unit, for performing the predetermined function;
a status notification register included in each of the at least one function executing section, for storing a state of the function executing section, the function executing section setting a first setting value in the status notification register thereof when the function executing section shifts to a reset state as an initial state in the event of a power failure; and
a monitoring control unit for performing a first monitoring control process on the plurality of functional units included in the apparatus, the first monitoring control process comprising:
monitoring a value of the status notification register;
determining that the power failure has occurred in the function executing section when a value of the status notification register thereof is the first setting value;
setting in the status notification register a second setting value different from the first setting value just after performing initial setting process on the function executing section to shift the function executing section to an operative state; and
determining that the function executing section is in an operative state when the value of the status notification register is the second setting value.

8. The apparatus of claim 7, further comprising:
a secondary power failure monitor included in the functional unit, for monitoring a power failure in secondary power supplied to the function executing section, the secondary power failure monitor outputting a reset control signal comprising an activated state and a deactivated state to the function executing section to reset the function executing section, wherein
the function executing section shifts to a reset state to block the operation thereof upon receiving the activated reset control signal, and the function executing section shifts to a reset release state and resumes the operation thereof upon receiving the reset control signal that is shifting from an activated state to a deactivated state.

9. The apparatus of claim 7, wherein
the monitoring control unit determines that the functional unit is in a power failure when at least one function executing section included in the functional unit is determined to be in a power failure, and
the monitoring control unit determines that the functional unit is in an operative state when each of function executing sections included in the functional unit in an operative state.

10. The apparatus of claim 9, further comprising:
a monitoring control processor included in the monitoring control unit, for performing a second monitoring control process on the plurality of functional units included in the apparatus; and
an initial setting order storage included in the monitoring control processor, for storing the order of initial setting processes on the plurality of functional units included in the apparatus, wherein the second monitoring control process comprises:
searching the plurality of functional units for an inoperative functional unit which is a functional unit not in an operative state, on the basis of the order of initial setting processes stored in the initial setting order storage, by checking a value of a status notification register included in each of the plurality of functional units;
selecting the inoperative functional unit which has been firstly found on the basis of the initial setting order information as an initial setting target functional unit;
determining whether a subsequent functional unit which is a functional unit subsequent to the initial setting target functional unit is in an operative state;
shifting the subsequent functional unit to a reset state when the subsequent functional unit is in an operative state; and
performing the initial setting process on the initial setting target functional unit.

11. The apparatus of claim 7, further comprising:
an initial setting determiner included in the function executing section, for determining the initial setting state of the function executing section, the initial setting determiner transmitting an initial setting complete signal representing the initial setting state of each function executing section from the function executing section at a preceding position to the function executing section at a subsequent position in a predetermined order starting from the leading position within the functional unit, wherein
the monitoring control unit monitors the occurrence of a power failure in the functional unit based on the content of the initial setting complete signal output from the function executing section at the last position in the predetermined order.

12. The apparatus of claim 11, wherein
the initial setting determiner sets a first value in the initial setting complete signal when the function executing section shifts to the reset state;
a first function executing section at the leading position in the predetermined order, sets a second value different from the first value in the initial setting complete signal when the first function executing section is in a reset release state with the second setting value on the status notification register thereof; and
a second function executing section at a position behind the leading position in the predetermined order sets the second value in the initial setting complete signal, when the second function executing section is in a reset release state with the second setting value in the status notification register thereof, and has received from the function executing section at an immediately prior position in the predetermined order the initial setting complete signal with the second value set therein.

* * * * *

UNITED STATES PATENT AND TRADEMARK OFFICE
CERTIFICATE OF CORRECTION

| | |
|---|---|
| PATENT NO. | : 7,676,693 B2 |
| APPLICATION NO. | : 11/783053 |
| DATED | : March 9, 2010 |
| INVENTOR(S) | : Hiroshi Otsuka |

It is certified that error appears in the above-identified patent and that said Letters Patent is hereby corrected as shown below:

Column 22, Line 8, after "value of" change "the" to --a--.

Column 22, Line 9, after "each of" change "a" to --the--.

Signed and Sealed this

Eighteenth Day of May, 2010

David J. Kappos
*Director of the United States Patent and Trademark Office*